(12) United States Patent
Manolakos et al.

(10) Patent No.: US 12,348,443 B2
(45) Date of Patent: Jul. 1, 2025

(54) INTRA-SLOT POSITIONING SIGNAL MUTING

(71) Applicant: QUALCOMM Incorporated, San Diego, CA (US)

(72) Inventors: Alexandros Manolakos, Escondido, CA (US); Weimin Duan, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/782,202

(22) PCT Filed: Dec. 17, 2020

(86) PCT No.: PCT/US2020/065500
§ 371 (c)(1),
(2) Date: Jun. 3, 2022

(87) PCT Pub. No.: WO2021/138063
PCT Pub. Date: Jul. 8, 2021

(65) Prior Publication Data
US 2023/0006790 A1    Jan. 5, 2023

(30) Foreign Application Priority Data

Jan. 3, 2020 (GR) .............................. 20200100001

(51) Int. Cl.
*H04L 5/00* (2006.01)
*H04W 64/00* (2009.01)
(Continued)

(52) U.S. Cl.
CPC ........... *H04L 5/0048* (2013.01); *H04W 64/00* (2013.01); *H04L 1/0007* (2013.01); *H04L 27/264* (2013.01); *H04W 72/20* (2023.01)

(58) Field of Classification Search
CPC ....... H04L 5/003; H04L 5/0048; H04L 5/005; H04L 5/0051; H04L 2012/5631;
(Continued)

(56) References Cited

U.S. PATENT DOCUMENTS 10,405,305 B2    9/2019   Hosseini et al.
10,484,992 B2    11/2019  Sadek et al.
(Continued)

FOREIGN PATENT DOCUMENTS

EP    3998793 A1 *   5/2022   ........... H04B 7/0608
TW    201911916 A    3/2019
(Continued)

OTHER PUBLICATIONS

Taiwan Search Report—TW109145008—TIPO—Jan. 16, 2024.
(Continued)

*Primary Examiner* — Warner Wong
(74) *Attorney, Agent, or Firm* — QUALCOMM Incorporated

(57) ABSTRACT

A method of selectively transmitting a positioning signal from a TRP includes: transmitting, unmuted, a first intra-slot positioning signal resource segment in a first slot of a transmission schedule in accordance with a muting configuration, the transmission schedule indicating which one or more resource elements to sound for transmitting at least a portion of the positioning signal, the muting configuration indicating whether to mute intra-slot positioning signal resource segments; and muting transmission by the TRP of a second intra-slot positioning signal resource segment in the first slot of the transmission schedule in accordance with the muting configuration.

33 Claims, 17 Drawing Sheets

(51) Int. Cl.
*H04L 1/00* (2006.01)
*H04L 27/26* (2006.01)
*H04W 72/20* (2023.01)

(58) Field of Classification Search
CPC ........ H04L 47/70; H04L 1/007; H04W 64/00; H04W 64/006; H04W 28/00; H04W 28/16; H04W 28/26; H04W 72/00; H04W 72/04; H04W 72/11; H04W 72/20; H04W 72/50; H04W 74/00; H04W 74/04
See application file for complete search history.

(56) References Cited

U.S. PATENT DOCUMENTS

| | | | | |
|---|---|---|---|---|
| 2013/0201941 | A1* | 8/2013 | Classon | H04L 5/0048 370/329 |
| 2017/0111880 | A1* | 4/2017 | Park | H04W 64/00 |
| 2019/0109732 | A1* | 4/2019 | Choi | H04L 5/0051 |
| 2019/0190669 | A1* | 6/2019 | Park | H04B 7/043 |
| 2020/0052845 | A1* | 2/2020 | Chuang | H04L 5/0048 |
| 2020/0177342 | A1* | 6/2020 | Pawar | H04W 72/23 |
| 2021/0160026 | A1* | 5/2021 | Wang | H04W 72/0446 |
| 2021/0211957 | A1* | 7/2021 | Kamohara | H04W 36/06 |
| 2021/0307045 | A1* | 9/2021 | Ma | H04L 27/2613 |
| 2022/0158791 | A1* | 5/2022 | Wu | H04L 1/0068 |
| 2022/0166656 | A1* | 5/2022 | Cha | H04W 64/00 |
| 2022/0182199 | A1* | 6/2022 | Guo | G01S 5/0205 |
| 2022/0200752 | A1* | 6/2022 | Matsumura | H04L 5/0048 |
| 2022/0248385 | A1* | 8/2022 | Cha | H04W 52/0216 |
| 2022/0263621 | A1* | 8/2022 | Cha | G01S 1/0428 |
| 2022/0271889 | A1* | 8/2022 | Matsumura | H04L 5/0042 |
| 2023/0198699 | A1* | 6/2023 | Wang | H04L 5/0048 370/329 |

FOREIGN PATENT DOCUMENTS

| | | |
|---|---|---|
| WO | 2011041623 A1 | 4/2011 |
| WO | 2018175011 A1 | 9/2018 |
| WO | 2018186952 | 10/2018 |

OTHER PUBLICATIONS

OPPO: "Discussion on DL Reference Signals for NR Positioning", 3GPP TSG RAN WG1 #98, R1-1910121, Chongqing, China, Oct. 14-20, 2019, 11 Pages.
CATT: "DL Reference Signals for NR Positioning", 3GPP Draft, 3GPP TSG RAN WG1 Meeting #98bis, R1-1910318, POS DL Reference Signals, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808500, 18 Pages, Retrieved from the Internet: URL: https://ftp.3gpp.org/tsg_ran/WG1_RL1/TSGR1_98b/Docs/R1-1910318.zip. R1-1910318 POS DL Reference Signals.docx [retrieved on Oct. 5, 2019] the whole document.
Ericsson: "DL Reference Signals for NR Positioning", 3GPP Draft, 3GPP TSG-RAN WG1 Meeting #98bis, R1-1911228, DL Reference Signals for NR Positioning, 3rd Generation Partnership Project (3GPP), Mobile Competence Centre, 650, Route Des Lucioles, F-06921 Sophia-Antipolis Cedex, France, vol. RAN WG1, No. Chongqing, P.R China, Oct. 14, 2019-Oct. 20, 2019, Oct. 4, 2019 (Oct. 4, 2019), XP051808350, 42 Pages, Retrieved from the Internet: URL: https://ftp.3gpp.org/tsg_ran/WG1_RL1/TSGR1_98b/Docs/R1-1911228.zip. R1-1911228 DL reference signals for NR positioning. docx [retrieved on Oct. 4, 2019] the whole document.
Huawei: "DL and UL Reference Signals for NR Positioning", 3GPP Draft; 3GPP TSG RAN WG1 Meeting #96bis, R1-1904004, 3rd Generation Partnership Project (3GPP), Mobile Competence Centre; 650, Route Des Lucioles; F-06921 Sophia-Antipolis Cedex; France, vol. RAN WG1, No. Xi'an, China; Apr. 8, 2019-Apr. 12, 2019, Apr. 2, 2019 (Apr. 2, 2019), XP051707080, 13 Pages, Retrieved from the Internet: URL: http://www.3gpp.org/ftp/tsg%5Fran/WG1%5FRL1/TSGR1%5F96b/Docs/R1%2D1904004%ZEzip [retrieved on Apr. 2, 2019], The whole document, Section 1, paragraph [02.3]—paragraph [02.4], p. 3.
Intel Corporation: "Feature Lead Summary #1 on AI 7.2.18.1—DL Reference Signals for NR Positioning", 3GPP Draft, R1-1911541, 3GPP TSG RAN WG1 Meeting #98bis, DL PRS—AI 7.2.18.1, Offline 2, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 22, 2019 (Oct. 22, 2019), XP051798805, 32 Pages, Retrieved from the Internet: URL: https://ftp.3gpp.org/tsq_ran/WG1_RL1/TSGR1_98b/Docs/R1-1911541.zip. R1-1911541 DL PRS-AI 7.2.18.1—Offline 2.docx [retrieved on Oct. 22, 2019] the whole document.
International Search Report and Written Opinion—PCT/US2020/065500—ISA/EPO—Apr. 8, 2021.
Qualcomm Incorporated: "DL Reference Signals for NR Positioning", 3GPP Draft, 3GPP TSG RAN WG1 #98, R1-1911132, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 5, 2019 (Oct. 5, 2019), XP051808855, 20 Pages, Retrieved from the Internet: URL: https://ftp.3gpp.org/tsg_ran/WG1_RL1/TSGR1_98b/Docs/R1-1911132.zip. R1-1911132.docx [retrieved on 2819-18-85] the whole document.

* cited by examiner

INTRA-SLOT POSITIONING SIGNAL MUTING

CROSS-REFERENCE TO RELATED APPLICATIONS

This application is the National Stage of International Application No. PCT/US2020/065500, filed Dec. 17, 2020, entitled "INTRA-SLOT POSITIONING SIGNAL MUTING," which claims the benefit of Greek Patent Application No. 20200100001, filed Jan. 3, 2020, entitled "INTRA-SLOT POSITIONING SIGNAL MUTING," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

In an embodiment, a method of selectively transmitting a positioning signal from a TRP (transmission/reception point) includes: transmitting, unmuted from the TRP, a first intra-slot positioning signal resource segment in a first slot of a transmission schedule in accordance with a muting configuration, the transmission schedule indicating which one or more resource elements to sound in each of a plurality of consecutive symbols for transmitting at least a portion of the positioning signal within a slot of the transmission schedule, the muting configuration indicating whether to mute each of a plurality of intra-slot positioning signal resource segments; and muting transmission by the TRP of a second intra-slot positioning signal resource segment in the first slot of the transmission schedule in accordance with the muting configuration; where the plurality of intra-slot positioning signal resource segments includes the first intra-slot positioning signal resource segment in the first slot and the second intra-slot positioning signal resource segment in the first slot, each of the plurality of intra-slot positioning signal resource segments including at least one symbol and being a separate portion of a respective slot.

Implementations of such a method may include one or more of the following features. The transmission schedule includes a first integer quantity G of intra-slot groups for the first slot, where G≥2, where each of the intra-slot groups indicates to sound all subcarriers of the transmission schedule over a respective set of symbols, where the muting configuration includes a second integer quantity M of intra-slot positioning signal resource segments in the first slot, and where M=G. Each of the intra-slot groups consists of an identical portion of the transmission schedule, having the same pattern of resource elements to be sounded.

Alternatively, implementations of such a method may include one or more of the following features. The transmission schedule includes a first integer quantity G of intra-slot groups for the first slot, where G≥2, wherein each of the intra-slot groups indicates to sound all subcarriers of the transmission schedule over a respective set of symbols, wherein the muting configuration includes a second integer quantity M of intra-slot positioning signal resource segments in the first slot, and wherein M>G. The second integer quantity M equals a number of symbols configured for a resource of the positioning signal in the first slot.

Also or alternatively, implementations of such a method may include one or more of the following features. The second intra-slot positioning signal resource segment in the first slot is a second portion of an intra-slot group of symbols, the intra-slot group of symbols including a first portion and the second portion, the first portion of the intra-slot group of symbols indicating to sound less than all subcarriers of the transmission schedule, the method further including determining, as a condition of muting transmission of the second intra-slot positioning signal resource segment, that a user equipment to receive the positioning signal is configured with a search window that can resolve aliased channel energy response peaks corresponding to the first portion of the intra-slot group of symbols. The method includes determining the muting configuration such that all indications to transmit corresponding intra-slot positioning signal resource segments in a slot unmuted are consecutive. The method includes: muting transmission of a first intra-slot positioning signal resource segment in a second slot of the transmission schedule; or transmitting, unmuted, a second intra-slot positioning signal resource segment in the second slot of the transmission schedule; or a combination thereof; where, according to the transmission schedule, the first intra-slot positioning signal resource segment in the second slot is scheduled for a same first time relative to the second slot as the first intra-slot positioning signal resource segment in the first slot is scheduled relative to the first slot, and the second intra-slot positioning signal resource segment in the second slot is scheduled for a same second time relative to the second slot as the second intra-slot positioning signal resource segment in the first slot is scheduled relative to the first slot. Transmitting, unmuted, the first intra-slot positioning signal resource segment in the first slot and muting transmission of the second intra-slot positioning signal resource segment in the first slot are performed in response to determining that the first slot of the transmission schedule includes at least three intra-slot groups that each indicates to sound all subcarriers of the transmission schedule over a respective set of symbols. Transmitting, unmuted, the first intra-slot positioning signal resource segment in the first slot and muting transmission of the second intra-slot positioning signal resource segment in the first slot are performed in response to determining that MAC-CE-based (Media Access Control-Control Element based) positioning signal triggering is in use or that DCI-based (Downlink Control Information based) positioning signal triggering is in use, or a combination thereof. The method includes determining the muting configuration based on a comb type and a resource length of the transmission schedule.

Also or alternatively, implementations of such a method may include one or more of the following features. The muting configuration is an intra-slot muting configuration, and the method includes obtaining the muting configuration by determining a logical combination of the intra-slot muting configuration and at least one of an inter-instance muting configuration or an intra-instance muting configuration. Determining the logical combination comprises determining: the intra-slot muting configuration AND the inter-instance muting configuration, wherein AND is a logical operator; or the intra-slot muting configuration AND the intra-instance muting configuration; or the intra-slot muting configuration AND the inter-instance muting configuration AND the intra-instance muting configuration. The muting configuration is a first muting configuration, the first intra-slot positioning signal resource segment corresponds to a first positioning signal resource, the TRP is a first TRP, and the method includes transmitting, unmuted from a second TRP, a third intra-slot positioning signal resource segment in accordance with a second muting configuration that is different from the first muting configuration, the third intra-slot positioning signal resource segment corresponding to a second positioning signal resource that is different from the first positioning signal resource.

In an embodiment, a TRP (transmission/reception point) includes: a transmitter; a memory; and a processor communicatively coupled to the transmitter and the memory and configured to: transmit, unmuted via the transmitter, a first intra-slot positioning signal resource segment in a first slot of a transmission schedule in accordance with a muting configuration, the transmission schedule indicating which one or more resource elements to sound in each of a plurality of consecutive symbols for transmitting at least a portion of a positioning signal within a slot of the transmission schedule, the muting configuration indicating whether to mute each of a plurality of intra-slot positioning signal resource segments; and mute transmission of a second intra-slot positioning signal resource segment in the first slot of the transmission schedule in accordance with the muting configuration; where the plurality of intra-slot positioning signal resource segments includes the first intra-slot positioning signal resource segment in the first slot and the second intra-slot positioning signal resource segment in the first slot, each of the plurality of intra-slot positioning signal resource segments including at least one symbol and being a separate portion of a respective slot.

Implementations of such a TRP may include one or more of the following features. The transmission schedule includes a first integer quantity G of intra-slot groups for the first slot, where $G \geq 2$, where each of the intra-slot groups indicates to sound all subcarriers of the transmission schedule over a respective set of symbols, where the muting configuration includes a second integer quantity M of intra-slot positioning signal resource segments in the first slot, and where $M=G$. Each of the intra-slot groups consists of an identical portion of the transmission schedule, having the same pattern of resource elements to be sounded.

Alternatively, implementations of such a TRP may include one or more of the following features. The transmission schedule includes a first integer quantity G of intra-slot groups for the first slot, where $G \geq 2$, where each of the intra-slot groups indicates to sound all subcarriers of the transmission schedule over a respective set of symbols, where the muting configuration includes a second integer quantity M of intra-slot positioning signal resource segments in the first slot, and where $M > G$. The second integer quantity M equals a number of symbols configured for a resource of the positioning signal in the first slot.

Also or alternatively, implementations of such a TRP may include one or more of the following features. The second intra-slot positioning signal resource segment in the first slot is a second portion of an intra-slot group of symbols, the intra-slot group of symbols including a first portion and the second portion, the first portion of the intra-slot group of symbols indicating to sound less than all subcarriers of the transmission schedule, and the processor is configured to mute transmission of the second intra-slot positioning signal resource segment in response to a determination that a user equipment to receive the positioning signal is configured with a search window that can resolve aliased channel energy response peaks corresponding to the first portion of the intra-slot group of symbols. The processor is configured to determine the muting configuration such that all indications to transmit corresponding intra-slot positioning signal resource segments in a slot unmuted are consecutive. The processor is configured to: mute transmission of a first intra-slot positioning signal resource segment in a second slot of the transmission schedule; or transmit, unmuted, a second intra-slot positioning signal resource segment in the second slot of the transmission schedule; or a combination thereof; where, according to the transmission schedule, the first intra-slot positioning signal resource segment in the second slot is scheduled for a same first time relative to the second slot as the first intra-slot positioning signal resource segment in the first slot is scheduled relative to the first slot, and the second intra-slot positioning signal resource segment in the second slot is scheduled for a same second time relative to the second slot as the second intra-slot positioning signal resource segment in the first slot is scheduled relative to the first slot. The processor is configured transmit, unmuted via the transmitter, the first intra-slot positioning signal resource segment in the first slot, and to mute transmission of the second intra-slot positioning signal resource segment in the first slot, in response to a determination that the first slot of the transmission schedule includes at least three intra-slot groups that each indicates to sound all subcarriers of the transmission schedule over a respective set of symbols. The processor is configured to transmit, unmuted via the transmitter, the first intra-slot positioning signal resource segment in the first slot, and to mute transmission of the second intra-slot positioning signal resource segment in the first slot: in response to a determination that MAC-CE-based (Media Access Control-Control Element based) positioning signal triggering is in use, or in response to a determination that DCI-based (Downlink Control Information based) positioning signal triggering is in use; or a combination thereof. The processor is configured to determine the muting configuration based on a comb type and a resource length of the transmission schedule.

Also or alternatively, implementations of such a TRP may include one or more of the following features. The muting configuration is an intra-slot muting configuration, and the processor is configured to obtain the muting configuration by determining a logical combination of the intra-slot muting configuration and at least one of an inter-instance muting configuration or an intra-instance muting configuration. To determine the logical combination the processor: is configured to determine the intra-slot muting configuration AND the inter-instance muting configuration, wherein AND is a logical operator; or is configured to determine the intra-slot muting configuration AND the intra-instance muting configuration; or is configured to determine the intra-slot muting configuration AND the inter-instance muting configuration AND the intra-instance muting configuration.

In an embodiment, a TRP includes: means for transmitting, unmuted, a first intra-slot positioning signal resource segment in a first slot of a transmission schedule in accordance with a muting configuration, the transmission schedule indicating which one or more resource elements to sound in each of a plurality of consecutive symbols for transmitting at least a portion of a positioning signal within a slot of the transmission schedule, the muting configuration indicating whether to mute each of a plurality of intra-slot positioning signal resource segments; and means for muting transmission of a second intra-slot positioning signal resource segment in the first slot of the transmission schedule in accordance with the muting configuration; where the plurality of intra-slot positioning signal resource segments includes the first intra-slot positioning signal resource segment in the first slot and the second intra-slot positioning signal resource segment in the first slot, each of the plurality of intra-slot positioning signal resource segments including at least one symbol and being a separate portion of a respective slot.

Implementations of such a TRP may include one or more of the following features. The transmission schedule includes a first integer quantity G of intra-slot groups for the first slot, where G≥2, where each of the intra-slot groups indicates to sound all subcarriers of the transmission schedule over a respective set of symbols, where the muting configuration includes a second integer quantity M of intra-slot positioning signal resource segments in the first slot, and where M=G. Each of the intra-slot groups consists of an identical portion of the transmission schedule, having the same pattern of resource elements to be sounded.

Alternatively, implementations of such a TRP may include one or more of the following features. The transmission schedule includes a first integer quantity G of intra-slot groups for the first slot, where G≥2, where each of the intra-slot groups indicates to sound all subcarriers of the transmission schedule over a respective set of symbols, where the muting configuration includes a second integer quantity M of intra-slot positioning signal resource segments in the first slot, and where M>G. The second integer quantity M equals a number of symbols configured for a resource of the positioning signal in the first slot.

Also or alternatively, implementations of such a TRP may include one or more of the following features. The second intra-slot positioning signal resource segment in the first slot is a second portion of an intra-slot group of symbols, the intra-slot group of symbols including a first portion and the second portion, the first portion of the intra-slot group of symbols indicating to sound less than all subcarriers of the transmission schedule, and the means for muting transmission of the second intra-slot positioning signal resource segment include means for muting transmission of the second intra-slot positioning signal resource segment responsive to determining that a user equipment to receive the positioning signal is configured with a search window that can resolve aliased channel energy response peaks corresponding to the first portion of the intra-slot group of symbols. The TRP includes means for determining the muting configuration such that all indications to transmit corresponding intra-slot positioning signal resource segments in a slot unmuted are consecutive. The TRP includes: means for muting transmission of a first intra-slot positioning signal resource segment in a second slot of the transmission schedule; or means for transmitting, unmuted, a second intra-slot positioning signal resource segment in the second slot of the transmission schedule; or a combination thereof; where, according to the transmission schedule, the first intra-slot positioning signal resource segment in the second slot is scheduled for a same first time relative to the second slot as the first intra-slot positioning signal resource segment in the first slot is scheduled relative to the first slot, and the second intra-slot positioning signal resource segment in the second slot is scheduled for a same second time relative to the second slot as the second intra-slot positioning signal resource segment in the first slot is scheduled relative to the first slot. The means for transmitting, unmuted, the first intra-slot positioning signal resource segment in the first slot and the means for muting transmission of the second intra-slot positioning signal resource segment in the first slot include means for transmitting, unmuted, the first intra-slot positioning signal resource segment in the first slot, and for muting transmission of the second intra-slot positioning signal resource segment in the first slot, in response to a determination that the first slot of the transmission schedule includes at least three intra-slot groups that each indicates to sound all subcarriers of the transmission schedule over a respective set of symbols. The means for transmitting, unmuted, the first intra-slot positioning signal resource segment in the first slot and the means for muting transmission of the second intra-slot positioning signal resource segment in the first slot include: means for transmitting, unmuted, the first intra-slot positioning signal resource segment in the first slot, and for muting transmission of the second intra-slot positioning signal resource segment in the first slot, in response to a determination that MAC-CE-based (Media Access Control-Control Element based) positioning signal triggering is in use; or means for transmitting, unmuted, the first intra-slot positioning signal resource segment in the first slot, and for muting transmission of the second intra-slot positioning signal resource segment in the first slot, in response to a determination that DCI-based (Downlink Control Information based) positioning signal triggering is in use; or a combination thereof. The TRP includes means for determining the muting configuration based on a comb type and a resource length of the transmission schedule.

Also or alternatively, implementations of such a TRP may include one or more of the following features. The muting configuration is an intra-slot muting configuration, and the TRP includes means for obtaining the muting configuration by determining a logical combination of the intra-slot muting configuration and at least one of an inter-instance muting configuration or an intra-instance muting configuration. The means for determining the logical combination include: means for determining the intra-slot muting configuration AND the inter-instance muting configuration, wherein AND is a logical operator; or means for determining the intra-slot muting configuration AND the intra-instance muting configuration; or means for determining the intra-slot muting configuration AND the inter-instance muting configuration AND the intra-instance muting configuration.

An example non-transitory, processor-readable storage medium includes processor-readable instructions to cause a processor of a TRP to: transmit, unmuted, a first intra-slot positioning signal resource segment in a first slot of a transmission schedule in accordance with a muting configuration, the transmission schedule indicating which one or more resource elements to sound in each of a plurality of consecutive symbols for transmitting at least a portion of a positioning signal within a slot of the transmission schedule, the muting configuration indicating whether to mute each of a plurality of intra-slot positioning signal resource segments; and mute transmission of a second intra-slot positioning signal resource segment in the first slot of the transmission schedule in accordance with the muting configuration; where the plurality of intra-slot positioning signal resource segments includes the first intra-slot positioning signal resource segment in the first slot and the second intra-slot positioning signal resource segment in the first slot, each of the plurality of intra-slot positioning signal resource segments including at least one symbol and being a separate portion of a respective slot.

Implementations of such storage medium may include one or more of the following features. The transmission schedule includes a first integer quantity G of intra-slot groups for the first slot, where G≥2, where each of the intra-slot groups indicates to sound all subcarriers of the transmission schedule over a respective set of symbols, where the muting configuration includes a second integer quantity M of intra-slot positioning signal resource segments in the first slot, and where M=G. Each of the intra-slot groups consists of an identical portion of the transmission schedule, having the same pattern of resource elements to be sounded.

Alternatively, implementations of such a storage medium may include one or more of the following features. The transmission schedule includes a first integer quantity G of intra-slot groups for the first slot, where G≥2, where each of the intra-slot groups indicates to sound all subcarriers of the transmission schedule over a respective set of symbols, where the muting configuration includes a second integer quantity M of intra-slot positioning signal resource segments in the first slot, and where M>G. The second integer quantity M equals a number of symbols configured for a resource of the positioning signal in the first slot.

Also or alternatively, implementations of such a storage medium may include one or more of the following features. The second intra-slot positioning signal resource segment in the first slot is a second portion of an intra-slot group of symbols, the intra-slot group of symbols including a first portion and the second portion, the first portion of the intra-slot group of symbols indicating to sound less than all subcarriers of the transmission schedule, and the instructions include instructions to cause the processor to mute transmission of the second intra-slot positioning signal resource segment in response to a determination that a user equipment to receive the positioning signal is configured with a search window that can resolve aliased channel energy response peaks corresponding to the first portion of the intra-slot group of symbols. The instructions include instructions to cause the processor to determine the muting configuration such that all indications to transmit corresponding intra-slot positioning signal resource segments in a slot unmuted are consecutive. The instructions include instructions to cause the processor to: mute transmission of a first intra-slot positioning signal resource segment in a second slot of the transmission schedule; or transmit, unmuted, a second intra-slot positioning signal resource segment in the second slot of the transmission schedule; or a combination thereof; where, according to the transmission schedule, the first intra-slot positioning signal resource segment in the second slot is scheduled for a same first time relative to the second slot as the first intra-slot positioning signal resource segment in the first slot is scheduled relative to the first slot, and the second intra-slot positioning signal resource segment in the second slot is scheduled for a same second time relative to the second slot as the second intra-slot positioning signal resource segment in the first slot is scheduled relative to the first slot. The instructions include instructions to cause the processor to transmit, unmuted, the first intra-slot positioning signal resource segment in the first slot, and mute transmission of the second intra-slot positioning signal resource segment in the first slot, in response to a determination that the first slot of the transmission schedule includes at least three intra-slot groups that each indicates to sound all subcarriers of the transmission schedule over a respective set of symbols. The instructions include instructions to cause the processor to transmit, unmuted, the first intra-slot positioning signal resource segment in the first slot, and to mute transmission of the second intra-slot positioning signal resource segment in the first slot: in response to a determination that MAC-CE-based (Media Access Control-Control Element based) positioning signal triggering is in use; or in response to a determination that DCI-based (Downlink Control Information based) positioning signal triggering is in use; or a combination thereof. The instructions include instructions to cause the processor to determine the muting configuration based on a comb type and a resource length of the transmission schedule.

Also or alternatively, implementations of such a storage medium may include one or more of the following features. The muting configuration is an intra-slot muting configuration, and to obtain the muting configuration the instructions include instructions to cause the processor to determine a logical combination of the intra-slot muting configuration and at least one of an inter-instance muting configuration or an intra-instance muting configuration. To determine the logical combination the instructions include instructions to cause the processor to: determine the intra-slot muting configuration AND the inter-instance muting configuration, wherein AND is a logical operator; or determine the intra-slot muting configuration AND the intra-instance muting configuration; or determine the intra-slot muting configuration AND the inter-instance muting configuration AND the intra-instance muting configuration.

DETAILED DESCRIPTION

Techniques are discussed herein for providing intra-slot muting of one or more positioning signals. For example, an apparatus such as a server can provide a muting configuration to a transmission/reception point (TRP) to indicate one or more segments of a slot of a transmission schedule to mute. A muting configuration may be produced or selected, e.g., by the server, to meet one or more criteria such as having unmuted segments of a slot be consecutive in time. The TRP may perform intra-slot muting based on one or more conditions being met such as that low-latency positioning signal triggering is in use, or that a user equipment will be able to resolve aliased time-domain peaks in view of muting indicated by a muting configuration in conjunction with a transmission schedule of symbols for conveying a positioning signal. Other configurations, however, may be used.

Items and/or techniques described herein may provide one or more of the following capabilities, as well as other capabilities not mentioned. Collisions of positioning signals may be reduced. Transmission and reception of positioning signals may be regulated to meet one or more performance criteria. Other capabilities may be provided and not every implementation according to the disclosure must provide any, let alone all, of the capabilities discussed.

Figure 1:
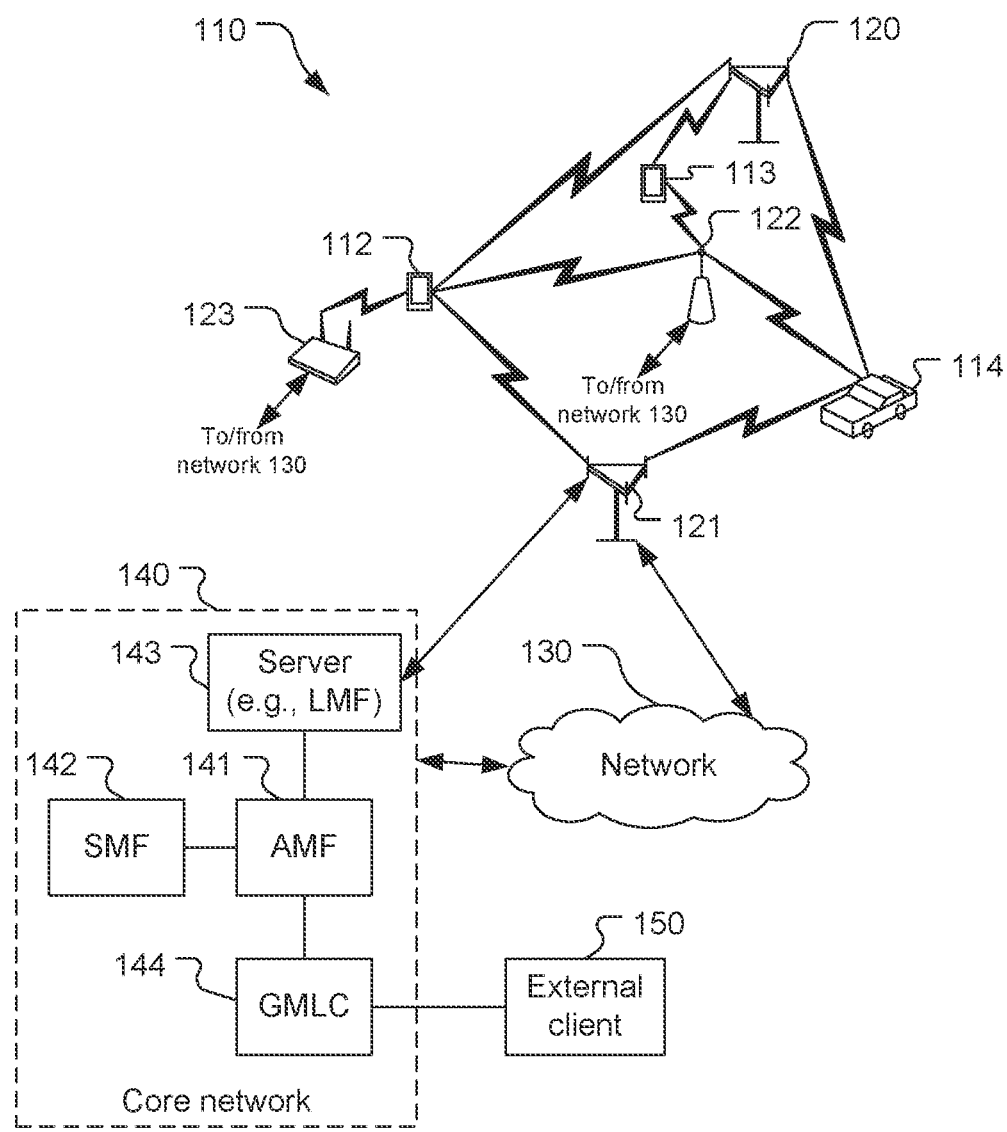
FIG. 1 is a simplified diagram of an example wireless communications system.

Referring to FIG. 1, an example wireless communications system 110 includes a user equipment (UE) 112, a UE 113, a UE 114, base transceiver stations (BTSs) 120, 121, 122, 123, a network 130, a core network 140, and an external client 150. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-114 (e.g., using techniques such as Assisted Global Navigation Satellite System (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival). AoD (Angle of Departure), etc.).

An LMF may also be referred to as a Location Manager (LM), a Location Function (LF), a commercial LMF (CLMF), or a value-added LMF (VLMF). The server 143 (e.g., an LMF) and/or one or more other devices of the system 110 (e.g., one or more of the UEs 112-114) may be configured to determine locations of the UEs 112-114. The server 143 may communicate directly with the BTS 121 (e.g., a gNB) and/or one or more other BTSs, and may be integrated with the BTS 121 and/or one or more other BTSs. The SMF 142 may serve as an initial contact point of a Service Control Function (SCF) (not shown) to create, control, and delete media sessions. The server 143 (e.g., an LMF) may be co-located or integrated with a gNB or a TRP (Transmission/Reception Point), or may be disposed remote from the gNB and/or TRP and configured to communicate directly or indirectly with the gNB and/or the TRP.

The AMF 141 may serve as a control node that processes signaling between the UEs 112-114 and the core network 140, and provides QoS (Quality of Service) flow and session management. The AMF 141 may support mobility of the UEs 112-114 including cell change and handover and may participate in supporting signaling connection to the UEs 112-114.

The system 110 is capable of wireless communication in that components of the system 110 can communicate with one another (at least some times using wireless connections) directly or indirectly, e.g., via the BTSs 120-123 and/or the network 130 (and/or one or more other devices not shown, such as one or more other base transceiver stations). For indirect communications, the communications may be altered during transmission from one entity to another, e.g., to alter header information of data packets, to change format, etc. The UEs 112-114 shown are a smartphone, a tablet computer, and a vehicle-based device, but these are examples only as the UEs 112-114 are not required to be any of these configurations, and other configurations of UEs may be used. The UEs 112, 113 shown are mobile wireless communication devices (although they may communicate wirelessly and via wired connections) including mobile phones (including smartphones) and a tablet computer. The UE 114 shown is a vehicle-based mobile wireless communication device (although the UE 114 may communicate wirelessly and via wired connections). Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 110 and may communicate with each other and/or with the UEs 112-114, the BTSs 120-123, the network 130, the core network 140, and/or the external client 150. For example, such other devices may include internet of thing (IoT) devices, medical devices, home entertainment and/or automation devices, etc. The core network 140 may communicate with the external client 150 (e.g., a computer system). e.g., to allow the external client 150 to request and/or receive location information regarding the UEs 112-114 (e.g., via the GMLC 144).

The UEs 112-114 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution). V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 110 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 120-123 may wirelessly communicate with the UEs 112-114 in the system 110 via one or more antennas. A BTS may also be referred to as a base station, an access point, a gNode B (gNB), an access node (AN), a Node B, an evolved Node B (eNB), etc. For example, each of the BTSs 120, 121 may be a gNB or a transmission point gNB, the BTS 122 may be a macro cell (e.g., a high-power cellular base station) and/or a small cell (e.g., a low-power cellular base station), and the BTS 123 may be an access point (e.g., a short-range base station configured to communicate with short-range technology such as WiFi, WiFi-Direct (WiFi-D), Bluetooth®, Bluetooth®-low energy (BLE), Zigbee, etc. One or more of the BTSs 120-123 may be configured to communicate with the UEs 112-114 via multiple carriers. Each of the BTSs 120, 121 may provide communication coverage for a respective geographic region, e.g. a cell. Each cell may be partitioned into multiple sectors as a function of the base station antennas.

The BTSs 120-123 each comprise one or more Transmission/Reception Points (TRPs). For example, each sector within a cell of a BTS may comprise a TRP, although multiple TRPs may share one or more components (e.g., share a processor but have separate antennas). The system 110 may include only macro TRPs or the system 110 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

The UEs 112-114 may be referred to as terminals, access terminals (ATs), mobile stations, mobile devices, subscriber units, etc. The UEs 112-114 may include various devices as listed above and/or other devices. The UEs 112-114 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 112-114 utilizing D2D communications may be within a geographic coverage area of a TRP such as one or more of the BTSs 120-123. Other UEs in such a group may be outside such geographic coverage areas, or be otherwise unable to receive transmissions from a base station. Groups of the UEs 112-114 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP.

Figure 2:
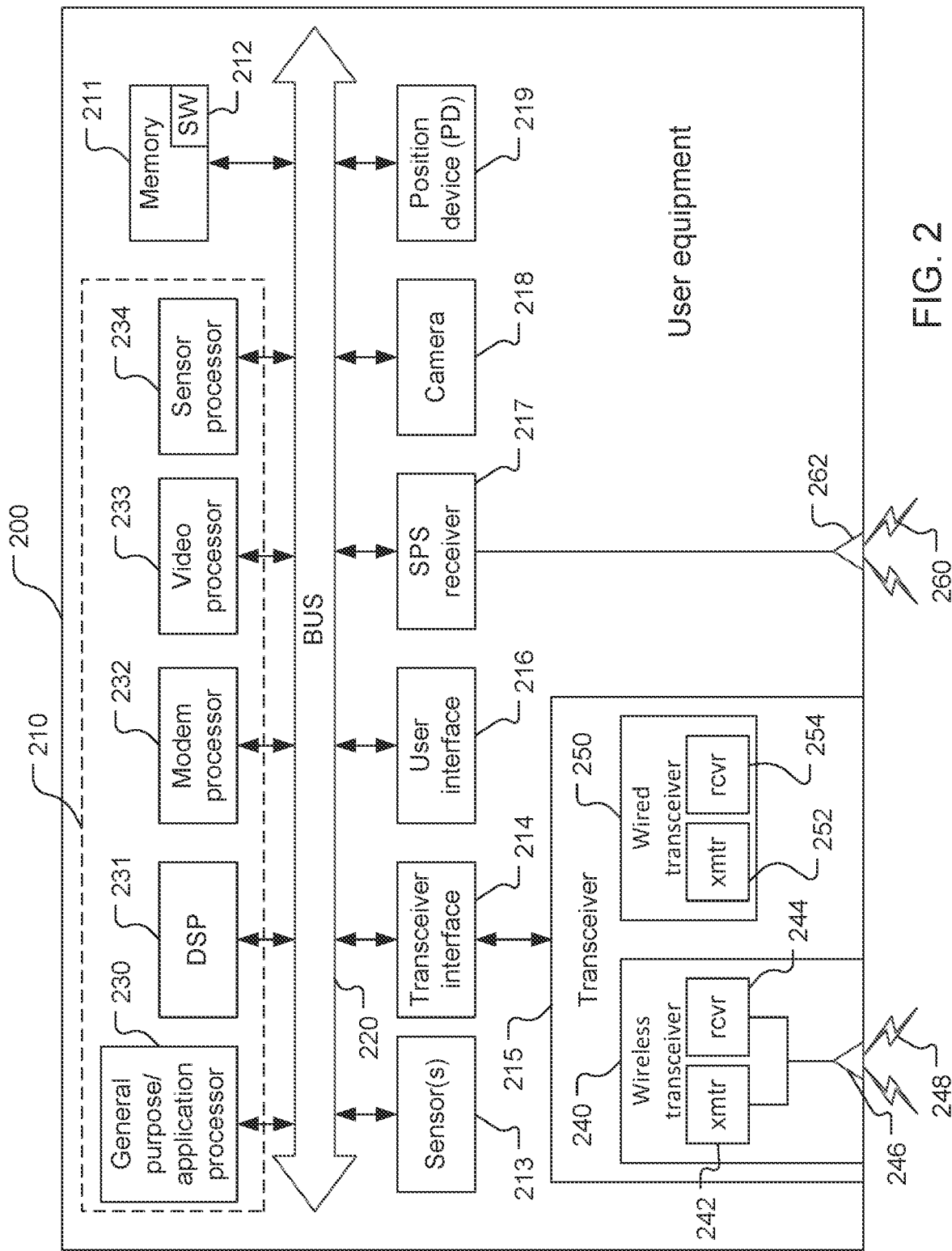
FIG. 2 is a block diagram of components of an example user equipment shown in FIG. 1.

Referring also to FIG. 2, a UE 200 is an example of one of the UEs 112-114 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured. e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 100 may be used in relative location measurements, relative location determination, motion determination, etc. Information detected by the sensor(s) 100 may be used for motion detection, relative displacement, dead reckoning, sensor-based location determination, and/or sensor-assisted location determination. The sensor(s) 100 may be useful to determine whether the UE 200 is fixed (stationary) or mobile and/or whether to report certain useful information to the server 143 regarding the mobility of the UE 200. For example, based on the information obtained/measured by the sensor(s), the UE 200 may notify/report to the server 143 that the UE 200 has detected movements or that the UE 200 has moved, and report the relative displacement/distance (e.g., via dead reckoning, or sensor-based location determination, or sensor-assisted location determination enabled by the sensor(s) 100). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles). UMTS (Universal Mobile Telecommunications System), AMPS (Advanced Mobile Phone System), CDMA (Code Division Multiple Access). WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®. Zigbee etc. New Radio may use mm-wave frequencies and/or sub-6 GHz frequencies. The wired transceiver 250 may include a wired transmitter 252 and a wired receiver 254 configured for wired communication, e.g., with the network 130 to send communications to, and receive communications from, the UE 200, for example. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the SPS signals 260 to wired signals, e.g., electrical or optical signals, and may be integrated with the antenna 246. The SPS receiver 217 may be configured to process, in whole or in part, the SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
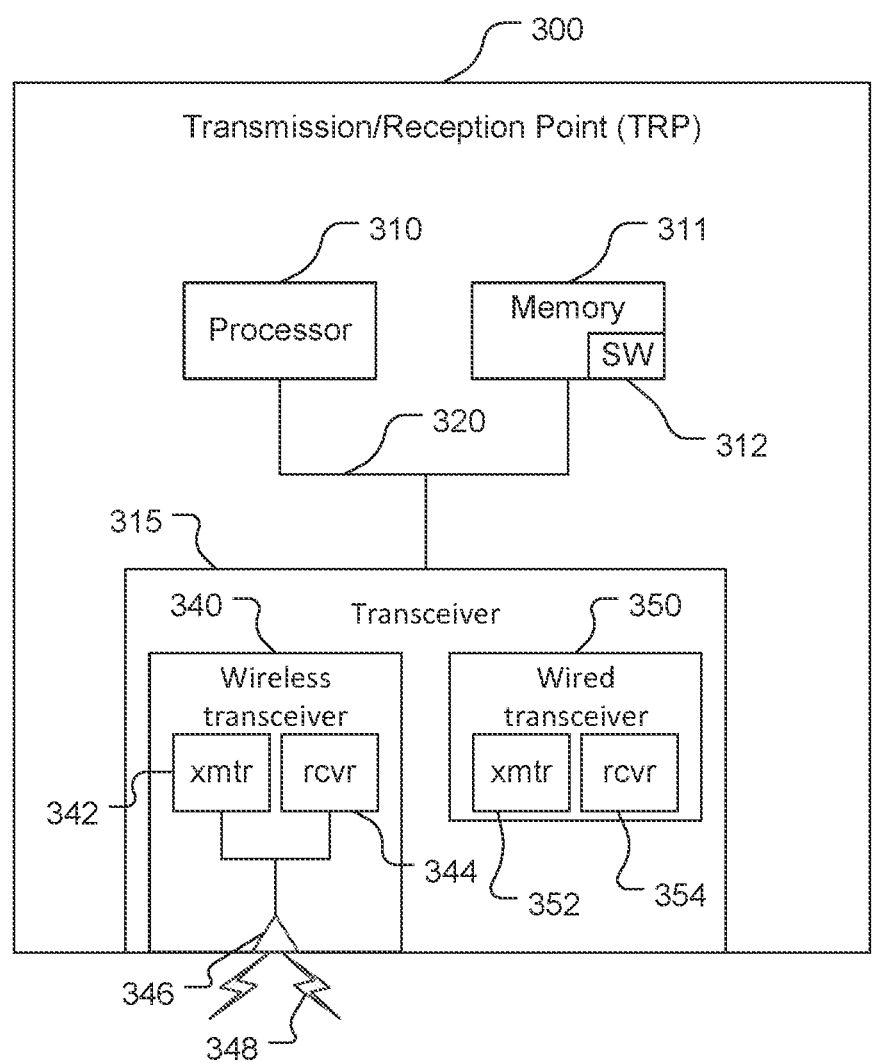
FIG. 3 is a block diagram of components of an example transmission/reception point shown in FIG. 1.

Referring also to FIG. 3, an example of a TRP 300 of the BTSs 120-123 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BTSs 120-123) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution). LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., with the network 130 to send communications to, and receive communications from, the server 143, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the server 143 and/or the UE 200 (i.e., the server 143 and/or the UE 200 may be configured to perform one or more of these functions).

Figure 4:
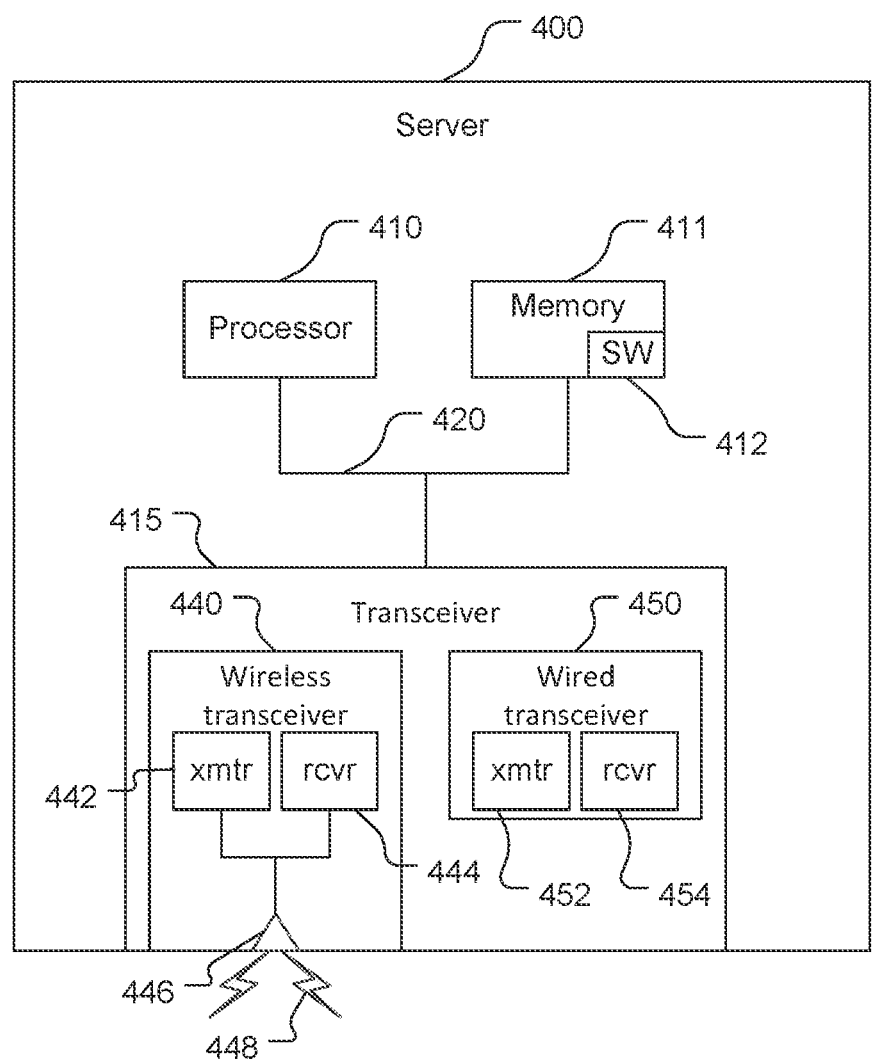
FIG. 4 is a block diagram of components of an example server shown in FIG. 1.

Referring also to FIG. 4, a server 400, which is an example of the server 143, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System). CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., with the network 130 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

One or more of many different positioning techniques (also called positioning methods) may be used to determine position of an entity such as one of the UEs 112-114. For example, known position-determination techniques include RTT, multi-RTT, OTDOA (also called TDOA and including UL-TDOA and DL-TDOA), Enhanced Cell Identification (E-CID), DL-AoD. UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RU), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

For positioning techniques using PRS (Positioning Reference Signal) signals (e.g., TDOA and RT). PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb-size.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (e.g., 12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

PRS Muting Configurations

Figure 5:
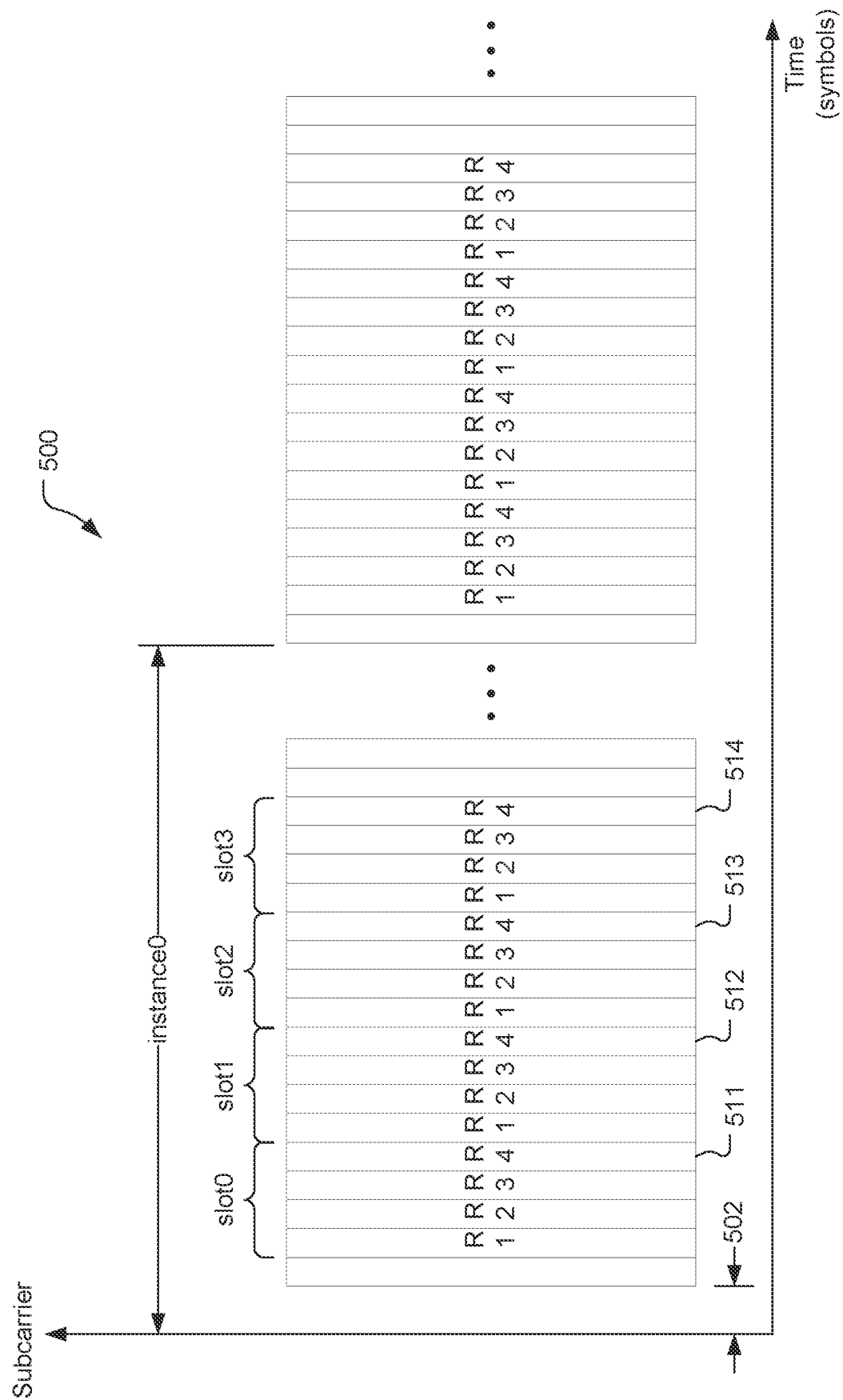
FIG. 5 is a simplified timing diagram of a resource set.

The TRP 300 may be configured, e.g., by instructions received from the server 400 and/or by the software 312, to send downlink positioning reference signals (DL-PRS) per a schedule. According to the schedule, the TRP 300 may send the DL-PRS signals intermittently, e.g., periodically at a consistent interval from an initial transmission. The TRP 300 may be configured to send one or more PRS resource sets. Each of the resource sets comprises multiple resources, with each resource being a beam transmitted by the TRP 300, and each resource being configured with a slot offset, a symbol offset within a slot, and a number of consecutive symbols that the resource may occupy. Each PRS resource is associated with one antenna port or beam, transmits a DL-PRS signal, and may repeat the transmission across slots, with each transmission being called a repetition such that there may be multiple repetitions in a resource. Each PRS resource set is associated with a periodicity. Every time all repetitions of all PRS resources of the PRS resource set are configured to be transmitted is referred as an "instance". Therefore, an "instance" of a PRS resource set is a specified number of repetitions for each resource and a specified number of resources within the resource set such that once the specified number of repetitions are transmitted for each of the specified number of resources, the instance is complete. An instance may also be referred to as an "occasion." Referring also to FIG. 5, an example instance of a PRS resource set 500, and a portion of another instance, are shown. The PRS resource set 500 includes four resources R1, R2, R3, R4 (each comb-2 or comb-4), with a repetition of 4, a time gap of 1, and a resource set slot offset 502. There are four repetitions of each resource in each instance, for example, four repetitions 511, 512, 513, 514 for the fourth resource R4.

Figure 6A:
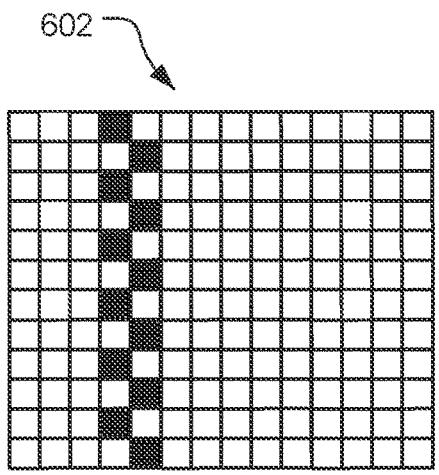
FIG. 6A is a simplified comb-2, 2-symbol transmission schedule.
Figure 6B:
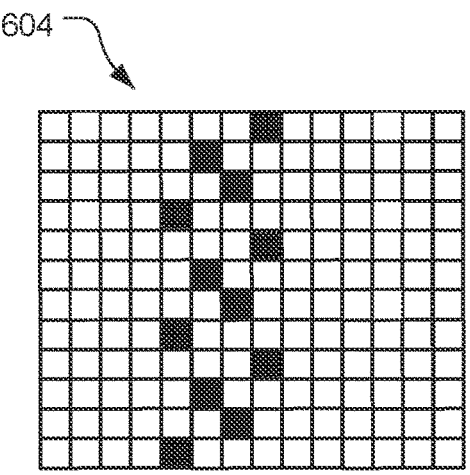
FIG. 6B is a simplified comb-4, 4-symbol transmission schedule.
Figure 6C:
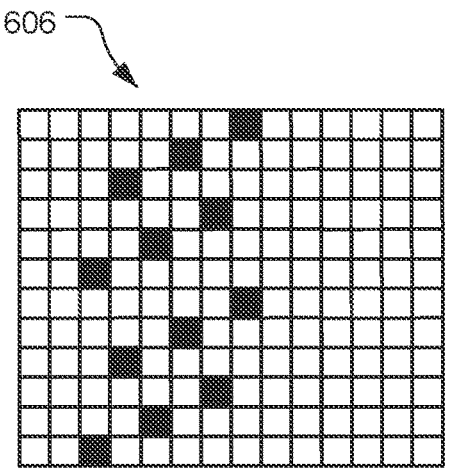
FIG. 6C is a simplified comb-6, 6-symbol transmission schedule.
Figure 6D:
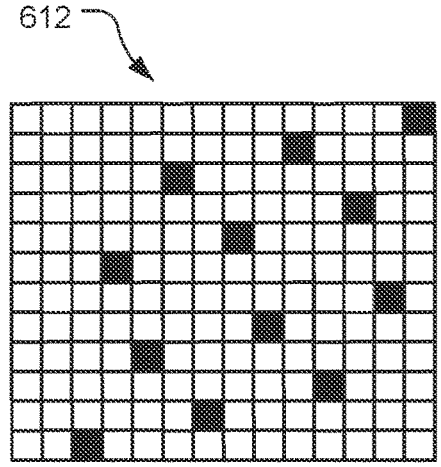
FIG. 6D is a simplified comb-12, 12-symbol transmission schedule.
Figure 6E:
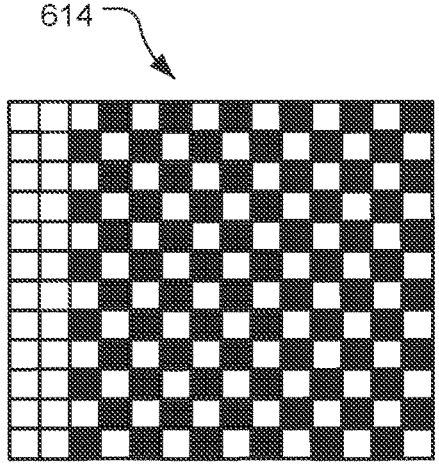
FIG. 6E is a simplified comb-2, 12-symbol transmission schedule.
Figure 6F:
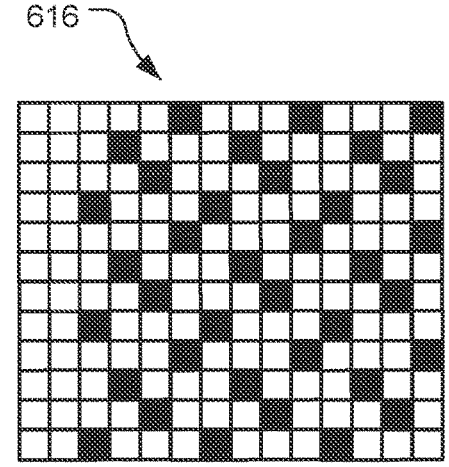
FIG. 6F is a simplified comb-4, 12-symbol transmission schedule.

A positioning signal muting configuration such as a PRS muting configuration (also called a PRS muting pattern) is a time schedule of when to mute a transmission schedule and when not to mute the transmission schedule. The transmission schedule is a time and subcarrier schedule of when and which resource elements are sounded (modulated with a signal) for conveying a signal such as a positioning signal. Referring also to FIGS. 6A-6F, examples of transmission schedules of resources of various combinations of comb types and quantities of symbols are shown. FIG. 6A shows a transmission schedule 602 for a comb-2, 2-symbol resource with a symbol offset 603 of three symbols in a slot containing 14 symbols each with 12 subcarriers. In the transmission schedules shown, columns represent different symbols, rows represent different subcarriers, and darkened boxes represent sounded resource elements (symbol-subcarrier combinations) for a TRP. Unsounded resource elements could be sounded by one or more other TRPs. FIG. 6B shows a transmission schedule 604 for a comb-4, 4-symbol resource. FIG. 6C shows a transmission schedule 606 for a comb-6, 6-symbol resource. FIG. 6D shows a transmission schedule 612 for a comb-12, 12-symbol resource. FIG. 6E shows a transmission schedule 614 for a comb-2, 12-symbol resource. FIG. 6F shows a transmission schedule 616 for a comb-4, 12-symbol resource.

A PRS muting configuration may be represented by a bitmap (i.e., a bit string) indicating when a PRS is to be muted and when the PRS is not to be muted, and thus the term bitmap and the term muting configuration are used interchangeably herein. For example, a bit value of "1" may indicate not to mute the corresponding PRS signal(s) transmission and a bit value of "0" may indicate to mute the corresponding PRS signal(s) transmission. The muting configuration may be inter-instance, in which case each bit in the bitmap indicates whether to mute all the PRS repetitions of all PRS resources in the corresponding configurable number of instances, or intra-instance, in which case each bit in the bitmap indicates whether to mute a corresponding PRS repetition of all PRS resources in an instance, or intra-slot, in which case each bit in the bitmap indicates whether to mute a corresponding symbol or set of symbols of one or more repetitions of one or more PRS resources. Thus, for an example of inter-instance muting with bitmap of 1010, transmission of the $0^{th}$ and $2^{nd}$ instances is not muted, and transmission of the $1^{st}$ and $3^{rd}$ instances is muted. For the same bitmap of 1010 but with intra-instance muting, transmission of the $0^{th}$ and $2^{nd}$ repetitions within each instance is not muted, and transmission of the $1^{st}$ and $3^{rd}$ repetitions in each instance is muted. For the same bitmap of 1010 but with intra-slot muting, transmission of the $0^{th}$ and $2^{nd}$ symbols (or symbol groups) in a respective slot is not muted, and transmission of the $1^{st}$ and $3^{rd}$ symbols (or symbol groups) in a respective slot is muted. As discussed further below, different slots may have different intra-slot muting configurations.

Figure 7:
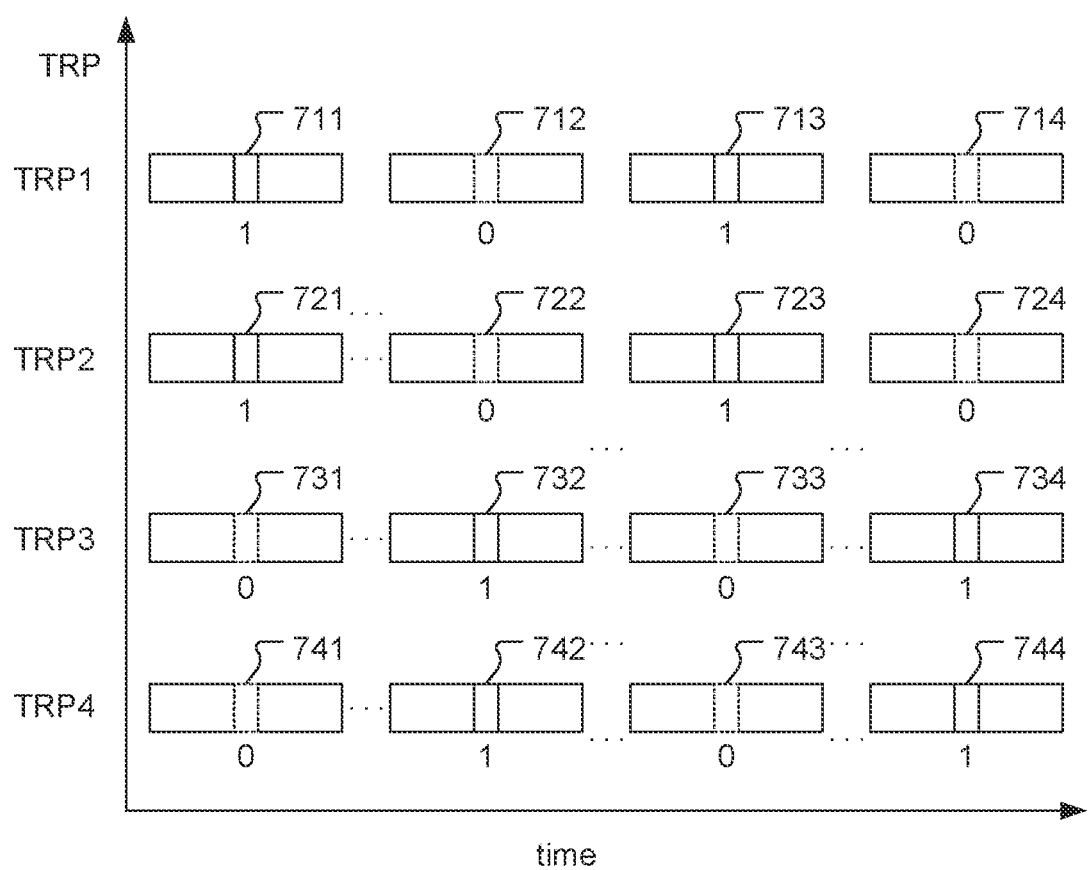
FIG. 7 is a timing diagram of muted and unmuted positioning signals conveyed between components of a wireless communications system such as that shown in FIG. 1.

Referring to FIG. 7, different muting configurations may be applied to different, e.g., neighboring, TRPs 300 to help reduce interference between the PRS signals from the neighboring TRPs. In this example, a PRS muting bitmap of 1010 is applied to TRP1 and TRP2, and a PRS muting bitmap of 010l is applied to TRP3 and TRP4. Thus, in this example, PRS transmissions 711, 713 from TRP1 are not muted and PRS transmissions 712, 714 are muted. Similarly, PRS transmissions 721, 723 from TRP2 are not muted and PRS transmissions 722, 724 are muted. Further, PRS transmissions 731, 733, 741, 743 from TRP3, TRP4, respectively, are muted and PRS transmissions 732, 734, 742, 744 are not muted. Each of the PRS transmissions may be a specific repetition (e.g. the first transmission in a batch of 4 repetitions) of a resource within an instance (for inter-instance muting) or a repetition (for intra-instance muting).

Inter-Instance Muting Configuration

Figure 8:
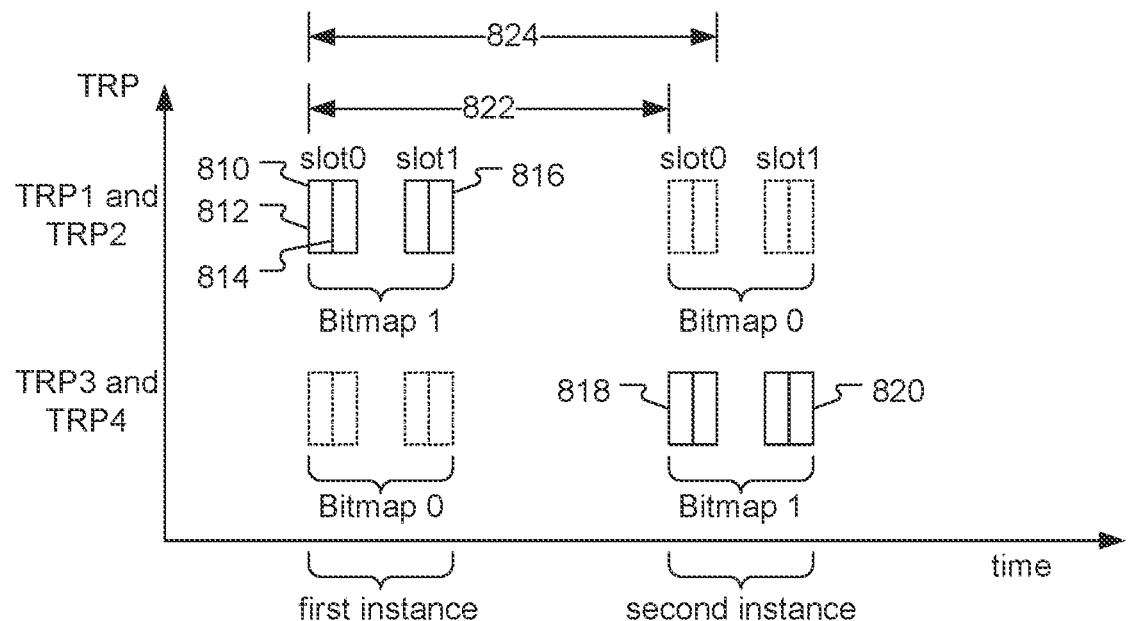
FIG. 8 is a timing diagram of an inter-instance transmission and muting configuration for positioning signals conveyed between components of a wireless communications system such as that shown in FIG. 1.

Numerous muting configurations may be used in combination with various scenarios of repetition quantity, symbols per repetition, comb types, and TRPs per repetition. Referring also to FIG. 8, an example of an inter-instance PRS muting configuration for a scenario of comb-2 transmission, two symbols per repetition, two repetitions per instance, and with a 2-bit muting bitmap is shown, although the comb-2 detail is not shown. A quantity of instances, e.g., consecutive instances, may be configurable and, in this example is one instance to help simplify the example. Comb-K indicates that in each symbol, the transmission scheduled is for each TRP to transmit in every $K^{th}$ subcarrier, with each TRP transmitting using different subcarriers in each symbol. Consequently, the different TRPs are frequency-division multiplexed to use different subcarriers to transmit PRS signals such that the PRS signals from different TRPs transmitted concurrently are frequency orthogonal to help prevent collisions between the PRS signals. Further, the TRPs may switch subcarriers, called staggering, for different symbols within a repetition to help fill holes in the frequency domain to help eliminate aliases in the time domain. For example, a repetition 810 comprising PRS signals sent from TRP1 and TRP2 includes a symbol 812 and a symbol 814. In the symbol 812, TRP1 may transmit TRP1's PRS signal using odd-numbered subcarriers and TRP2 may transmit TRP2's PRS signal using even-numbered subcarriers. In the symbol 814, TRP1 may transmit TRP1's PRS signal using even-numbered subcarriers and TRP2 may transmit TRP2's PRS signal using odd-numbered subcarriers. The two repetitions per instance in this example are transmitted in consecutive slots (slot0 and slot1) although this is not required.

The muting configuration shown in FIG. 8 comprises a 2-bit muting bitmap for each pair of TRPs. In this example, a value of "1" in the bitmap corresponds to transmitting the PRS signal(s) without muting and a value of "0" in the bitmap corresponds to muting the PRS signal(s). Muted PRS signals are shown in dotted lines in FIG. 8 and non-muted PRS signals are shown in solid lines. The TRP1 and TRP2 pair has a bitmap muting configuration of "10" and the TRP3 and TRP4 pair has a bitmap muting configuration of "01" in this example. While only one instance is shown corresponding to each bit in each bitmap, more than one instance may correspond to a bit in a bitmap, with the quantity of instances corresponding to a bit being configurable. Thus, a bit in the bitmap may correspond to a configurable number of (consecutive) instances of a DL-PRS resource set in a periodic transmission of DL-PRS resource sets. In the inter-instance muting shown, all DL-PRS resources within a DL-PRS resource set instance are muted for a DL-PRS resource set instance that is indicated to be muted by the bitmap.

With the bitmaps shown, the TRPs TRP1 and TRP2 transmit PRS signals in both repetitions (the repetition 810 and a repetition 816) without muting during the first instance and have PRS signals muted during the second instance, and the TRPs TRP3 and TRP4 have PRS signals muted during the first instance and transmit PRS signals in both repetitions (repetitions 818, 820) without muting during the second instance. Beginnings of the first and second instances are separated in time by a periodicity 822, a value of which depends on parameters such as quantities of repetitions per instance and number of resources. The value of the periodicity 822 may be, for example, about 160 ms. The UE 200 measures PRS signals during the first and second instances to receive the PRS signals from all four of the TRPs TRP1, TRP2, TRP3, TRP4. The UE 200 may use measurements of the repetitions 810, 816 and at least the repetition 818

(spanning a time window 824 equal to the periodicity 822 plus the time for the repetition 818) to acquire the PRS signals from all four of the TRPs TRP1, TRP2, TRP3, TRP4.

Intra-Instance Muting Configuration

Figure 9:
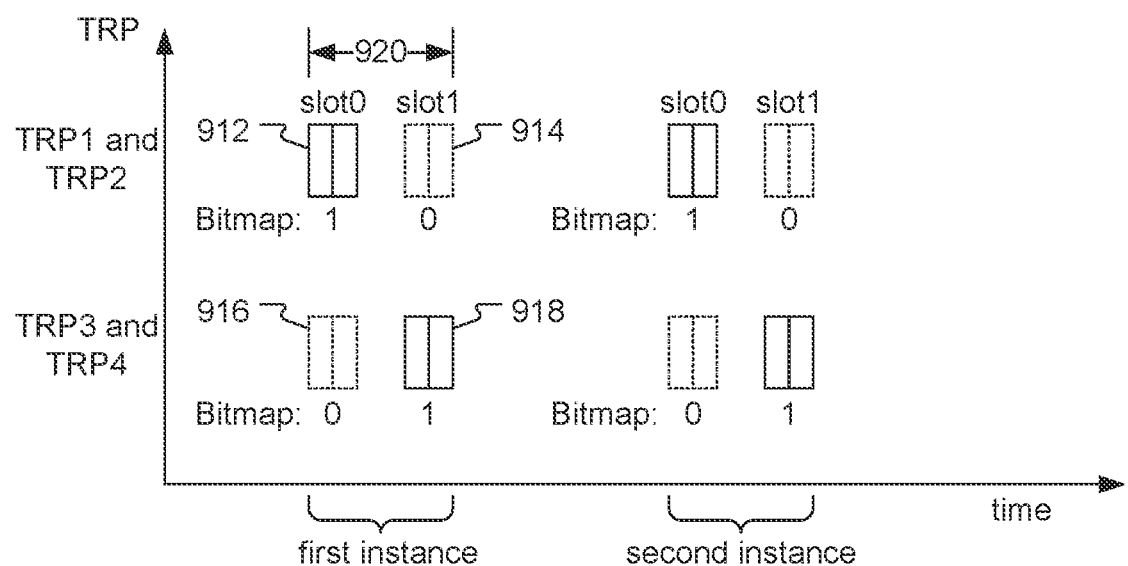
FIG. 9 is a timing diagram of an intra-instance transmission and muting configuration for positioning signals conveyed between components of a wireless communications system such as that shown in FIG. 1.

Referring also to FIG. 9, an example of an intra-instance PRS muting configuration for a scenario of comb-2 transmission, two symbols per repetition, two repetitions per instance, and with a 2-bit muting bitmap is shown, although the comb-2 detail is not shown. Similar to the inter-instance example shown in FIG. 8, there are four TRPs transmitting respective comb-2 PRS signals two symbols in length for each repetition. Each TRP is given a 2-bit bitmap muting configuration, with each bit corresponding to a respective repetition in a respective instance. In this scenario, the PRS signals from TRP1 and TRP2 are not muted during a first repetition 912 during the first instance, and are muted during a second repetition 914 during the first instance. Conversely, the PRS signals from TRP3 and TRP4 are muted during a first repetition 916 during the first instance, and are not muted during a second repetition 918 during the first instance. A similar schedule is followed for the second instance as for the first instance. In this scenario, the UE 200 may measure PRS signals from all four of the TRPs in a time window 920 that spans the first instance.

The scenarios shown in FIGS. 8 and 9 are examples only and many other scenarios may be used. For example, bitmaps of other sizes may be used, e.g., 4 bits, 8 bits, 16 bits, 32 bits, etc. Thus, in an intra-instance scenario similar to FIG. 9, but with a bitmap of four bits, each bit may correspond to each of four repetitions in an instance. Numerous muting configurations of repetitions within an instance may be used for different TRPs or sets of TRPs for intra-instance PRS muting scenarios. As another example, more than four TRPs may be transmitting PRS signals.

Intra-Slot Muting Configuration

Figure 10:
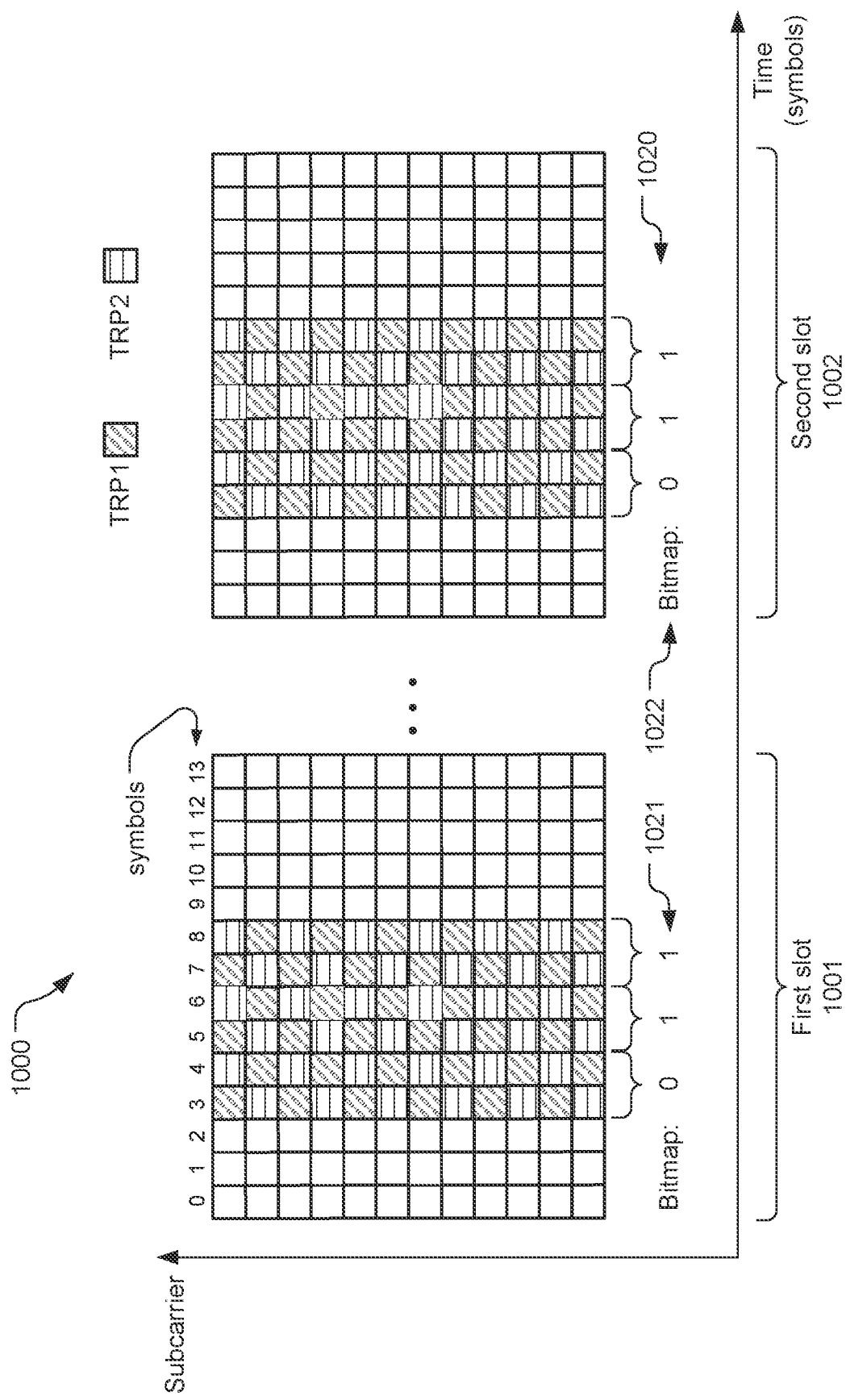
FIG. 10 is a timing diagram of intra-slot transmission and muting configurations for positioning signals conveyed between components of a wireless communications system such as that shown in FIG. 1.

Referring also to FIG. 10, an example of intra-slot PRS muting for a scenario of comb-2 transmission, six symbols per repetition, two repetitions per instance, and with a 3-bit muting bitmap is shown. FIG. 10 shows a transmission schedule 1000 for two slots, which is a portion of a larger transmission schedule for transmitting signals including a positioning signal. Here, the transmission schedule indicates four portions of positioning signals from two TRPs (TRP1 and TRP2) to be carried by symbols 3-8 of each of a first slot 1001 and a second slot 1002. A muting configuration 1020 is represented by bitmap portions 1021, 1022 for the slots 1001, 1002, respectively. Each bit of the bitmap representing the muting configuration 1020 corresponds to a respective segment of the respective slot 1001, 1002. In this example, each segment is equal in size and corresponds to an intra-slot group of symbols, with each group indicating to sound all resource elements of the transmission schedule over a respective set of symbols. Different intra-slot groups may be the same (i.e., intra-slot repetitions with identical patterns of sounded resource elements) or different (i.e., have different resource element patterns over the symbols used, even if they sound all the same subcarriers). In this example, a quantity G of intra-slot groups is equal to N/K, where N is the length of the PRS resource in number of symbols in a slot (here, six symbols) and K is the comb type (i.e., comb number), and a quantity M of slot segments equals G (M=G). Thus, as shown, with a PRS resource length (i.e., the length of the resource in symbols) of six symbols and a comb type of 2, there are three intra-slot groups (G=3) of two symbols each, and three bits per bitmap portion (M=3), one bit for each intra-slot group, i.e., each segment corresponding to a bit in the bitmap also corresponding to one intra-slot group in this example.

Figure 11:
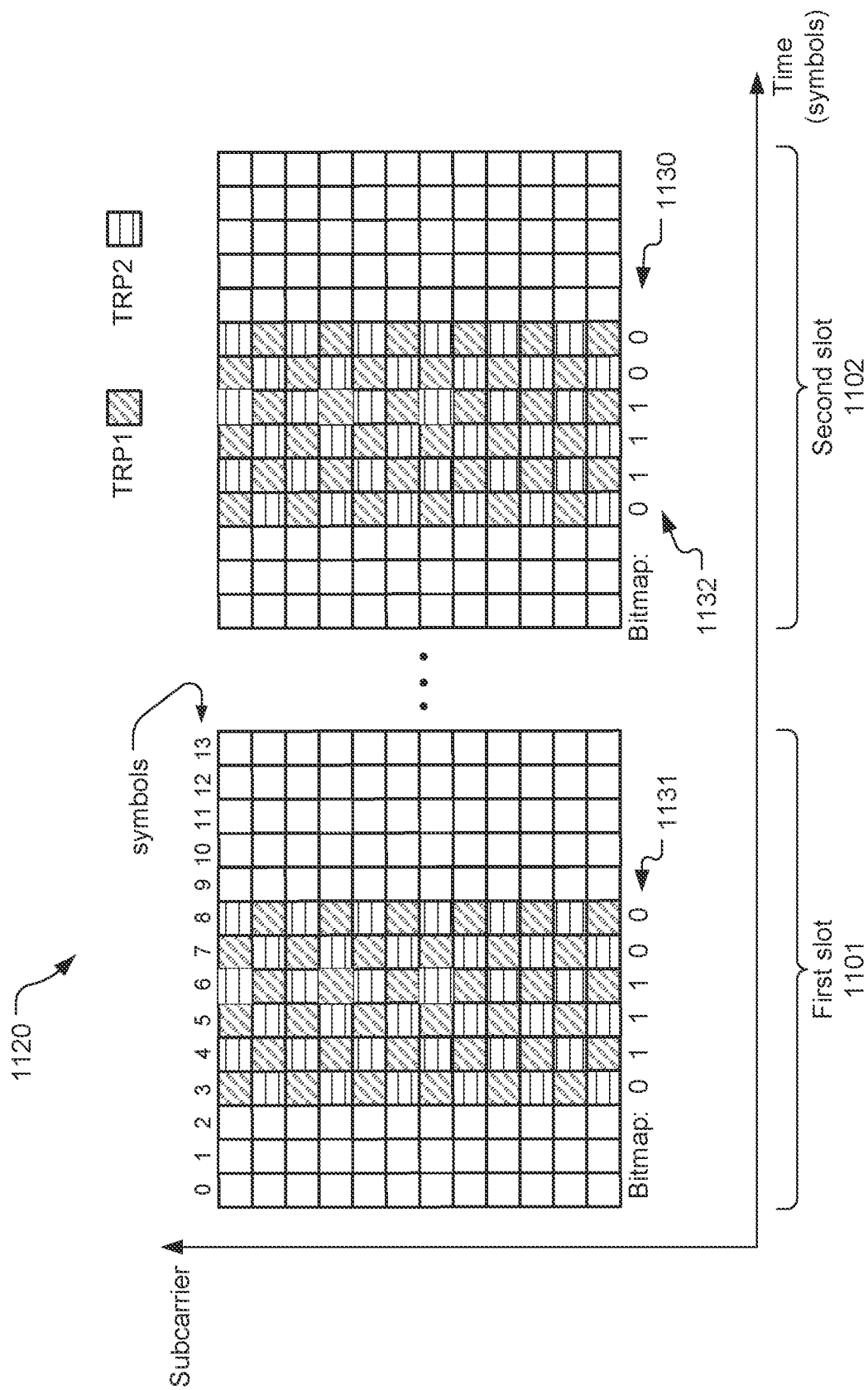
FIG. 11 is another timing diagram of intra-slot transmission and muting configurations for positioning signals conveyed between components of a wireless communications system such as that shown in FIG. 1.

The muting configuration 1020 is an example, both in terms of mapping of bits to symbols and in a pattern of bits shown, and other examples may be used. For example, referring to FIG. 11, for a transmission schedule 1120 identical to the transmission schedule 1000, a muting configuration 1130 has each slot segment corresponding to a bit in bitmap portions 1131, 1132 representing the muting configuration 1130. Each slot segment corresponds to a single symbol (instead of an intra-slot group of symbols as with the muting configuration 1020) in respective slots 1101, 1102. In this example, the quantity M of slot segments is greater than the quantity G of intra-slot groups (M>G), and is equal to N, the length of the PRS in number of symbols in a slot. The bitmap portions 1131, 1132 thus, in this example, each have N bits where N is the length of the PRS in number of symbols in a slot.

Figure 12:
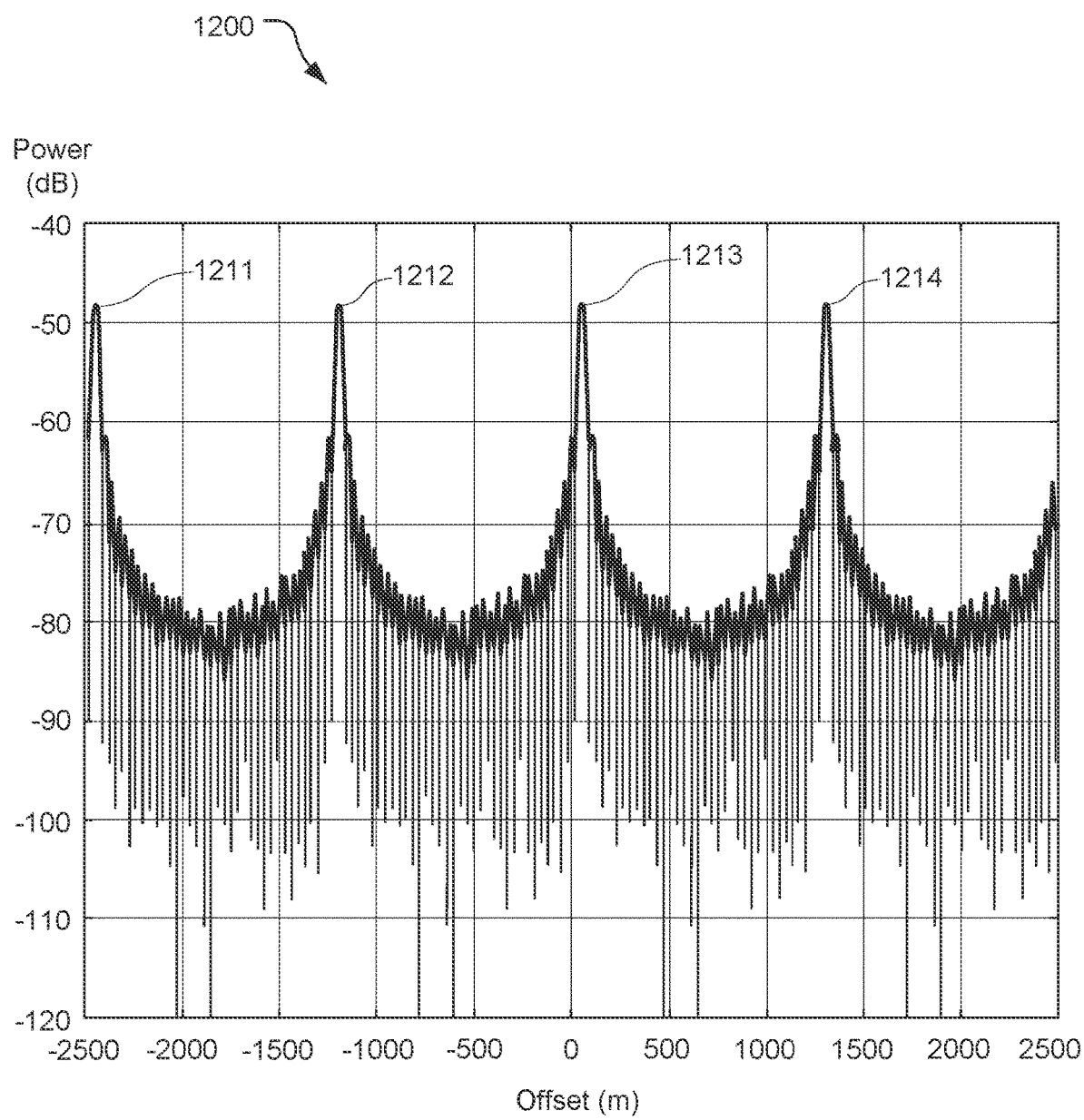
FIG. 12 is a graph of a channel energy response for a comb-4, 4-symbol transmission schedule with three symbols muted.

One or more constraints may be placed on using single-symbol muting granularity. For example, single-symbol slot segment granularity of transmission muting may be enabled only if the remaining symbols of the PRS resource (i.e., the collection of symbols in a slot for conveying the PRS signal) yield aliased peaks in the time domain that can be resolved by an expected RSTD (Reference Signal Time Difference) uncertainty window. That is, it may be a requirement that a UE to receive the PRS signal has a search window that is below a threshold amount of time such that the aliased peaks of the PRS signal can be resolved (i.e., will include only one aliased peak). In general, this means that the search window used by the UE would be less than T*1000/(14K) nsec where T is a slot size in microseconds, and K is the comb type (comb number). Referring to FIG. 12, an example channel energy response (CER) 1200 corresponds to a comb-4, 4-symbol transmission schedule with three of the four symbols muted. The CER 1200 has four peaks 1211, 1212, 1213, 1214 with the peak 1213 being the true peak and the peak 1211 being the strongest (highest power) peak.

Figure 13:
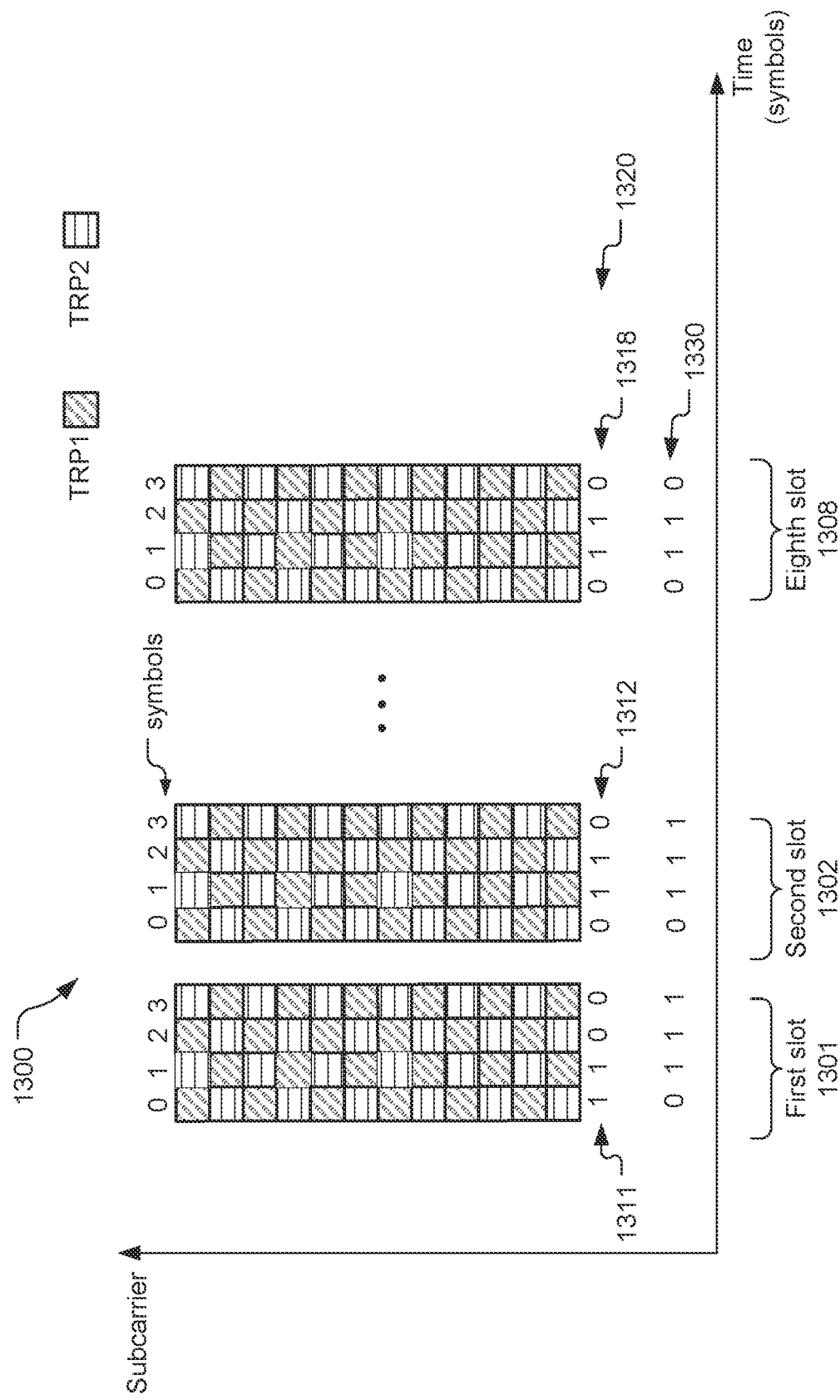
FIG. 13 is a timing diagram of intra-slot transmission and muting configurations for positioning signals conveyed between components of a wireless communications system such as that shown in FIG. 1, showing different muting configurations for different slots.
Figure 14:
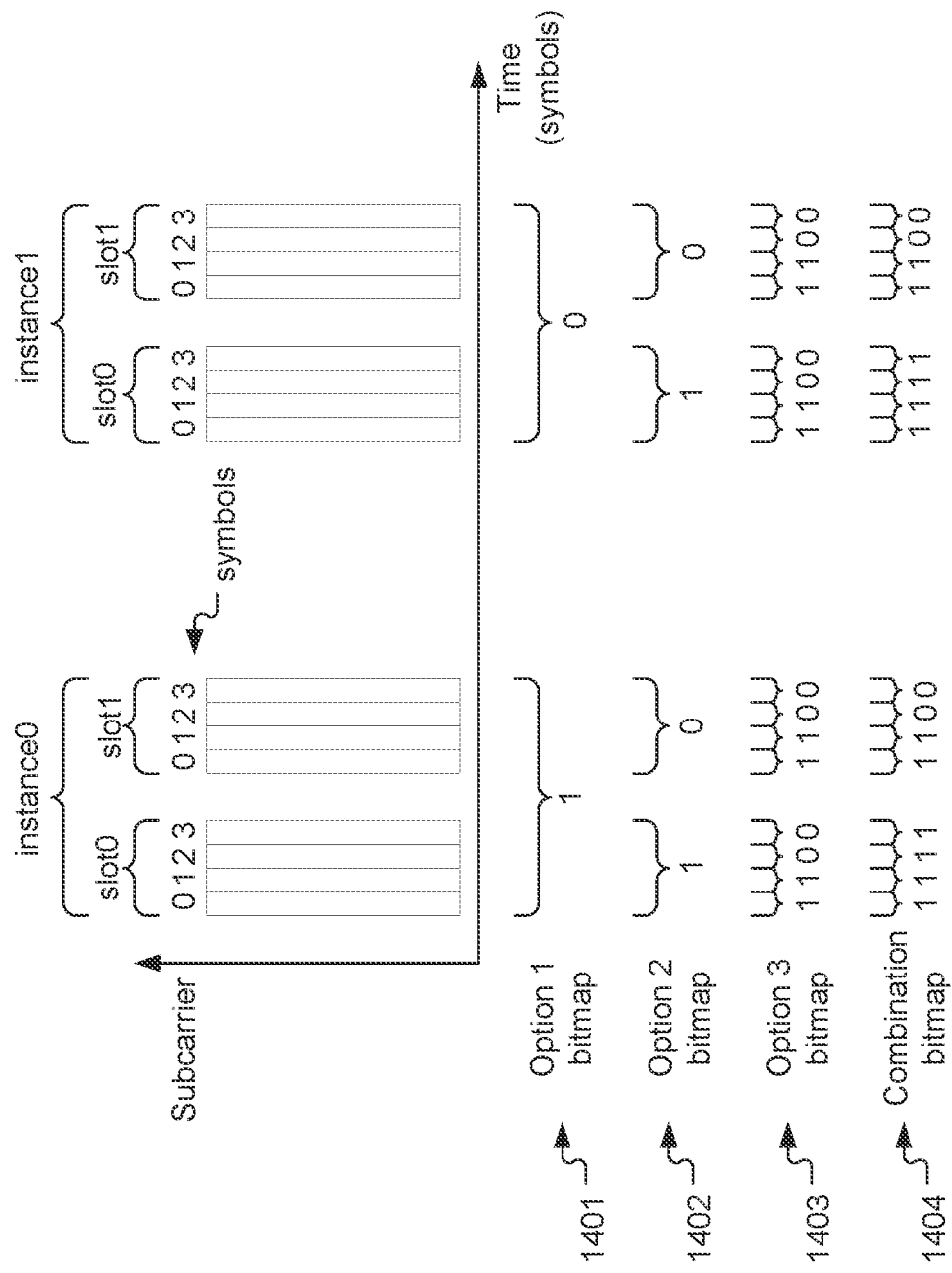
FIG. 14 is an illustration of using bitmaps for inter-instance, intra-instance, and intra-slot muting to determine another intra-slot muting configuration.

As another example, a muting configuration may vary over different slots and/or resources. Thus, referring to FIG. 13, an intra-slot muting configuration (which may be called an intra-resource muting configuration) may have different muting configurations for different slots and/or resources. A transmission schedule 1300 has comb-2, two symbols per intra-slot group, but with four symbols per repetition and eight repetitions per instance. As shown, a muting configuration 1320 is represented by bitmap portions 1311, 1312, 1318 for the slots shown, respectively, namely a first slot 1301, a second slot 1302, and an eighth slot 1308. The bitmap portion 1311 is different from the bitmap portions 1312, 1318, with the bitmap portions 1312, 1318 being the same. In this example, with four bits per repetition and eight repetitions per instance, the bitmap has 32 bits. Intra-slot muting may be different for different resources. For example, one muting configuration may apply to one or more resources and another muting configuration apply to one or more other resources, even in the same slot. For example, the muting configuration 1320 may apply to the resources from TRP1 and TRP2, or may apply to the resource from TRP1 and another muting configuration 1330 may apply to the resource from TRP2. The configuration shown is FIG. 13 is an example only, and other muting configurations with different muting configurations for different slots may be used.

Bitmaps for intra-slot muting configurations may contain more bits than bitmaps for other muting configuration types (e.g., inter-instance muting and intra-instance muting discussed with respect to FIGS. 8 and 9, respectively). For example, for intra-slot muting with each segment corresponding to an intra-slot group of symbols (i.e., that indicate to sound all of the subcarriers), then B bits are used where B=N/K, where N is the length of the PRS in number of symbols in a slot and K is the comb type (i.e., comb number). For intra-slot muting with each segment corresponding to a symbol, then N bits are used for each slot muting configuration where N is the length of the PRS in number of symbols in a slot.

PRS Muting Configuration Determination

The server 400 may be configured to determine (e.g., produce and/or select) PRS muting configurations. The TRP 300 may be configured to determine PRS muting configurations alone or in conjunction with the server 400, although the discussion herein may refer only to the server determining the PRS muting configurations. The server 400 may be configured to determine a PRS muting configuration in a variety of manners. For example, the server 400 may be configured to select one or more predefined bitmap schedules, e.g., stored in the memory 411. As another example, the server 400 may be configured to randomly generate values for a muting configuration. As another example, the server 400 may be configured to produce a muting configuration to meet one or more criteria such as sufficient symbols for resolving aliased peaks, or consecutive unmuted symbols, etc. The server 400 may be configured to produce a PRS muting configuration by concatenating multiple bitmaps. For example, the server 400 may be configured to add a bitmap to another bitmap to extend a PRS muting configuration. The server 400 may be configured to select a predefined starting bitmap that is well-balanced between muting and non-muting indications. Thus, as an example, the server 400 may be configured to start with a bitmap of four bits with two muting indications and two non-muting indications, then add another bitmap such as a randomly-generated 16-bit bitmap that meets specified criteria, then add one or more other bitmaps as appropriate.

The server 400 may be configured to perform a logical or mathematical operation on one or more bitmaps to produce another bitmap for a muting configuration. For example, the server 400 may be configured to perform a logical or a mathematical operation on the first bitmap portions 1021, 1022 or the bitmap portions 1131, 1132 to yield a different muting configuration than the muting configuration 1020 or the muting configuration 1130. The server 400 may perform different logical or mathematical operations on the different bitmap portions 1021, 1022 or the different bitmap portions 1131, 1132. As another example, the server 400 may be configured to perform logical operations on combinations of bitmaps. For example, referring to FIG. 14, three bitmaps 1401, 1402, 1403 are shown corresponding to inter-instance muting (called Option 1), an example of which is shown in FIG. 8, intra-instance muting (called Option 2), an example of which is shown in FIG. 9, and intra-slot muting (called Option 3), examples of which are shown in FIGS. 10, 11, 13, and 14. The server 400 may be configured to calculate a logical and/or a mathematical combination of Option 1, Option 2, and/or Option 3 to produce a combination bitmap 1404 corresponding to an intra-slot muting configuration. For example, the server 400 may be configured to calculate a logical AND, a logical OR, a logical XOR, etc. of two or more of the bitmaps 1401, 1402, 1403. The server 400 may be configured to calculate multiple logical combinations (e.g., an OR of the bitmaps 1402 and 1403 and an XOR of the result with the bitmap 1403). In the example shown in FIG. 14, the server 400 calculates a logical OR of all three of the bitmaps 1401, 1402, 1403 to yield the combination bitmap 1404. Other, non-exhaustive, examples include a logical AND of Option 1 and Option 3, a logical AND of Option 2 and Option 3, or a logical AND of Option 1 and Option 2 and Option 3 (i.e., Option 1 AND Option 2 AND Option 3).

The bitmap produced by the server 400 for a muting configuration may be repeated by the appropriate TRP(s). The server 400 may be configured to provide a completed bitmap to each TRP 300. The server 400 may be configured to continue to add to the bitmap indefinitely, but will typically stop the bitmap at some finite length and provide this completed bitmap to the TRP 300. The server 400 may be configured, however, to modify the bitmap over time, e.g., by sending the TRP 300 a new bitmap or an instruction to alter the existing bitmap.

The server 400 may be configured to consider one or more of a variety of criteria regarding positioning signal transmission and/or reception (e.g., key performance indicators) for a PRS muting configuration to meet. For example, the server 400 may be configured to analyze any selected or produced bitmap to determine whether all unmuted symbols in a slot are consecutive, and discard or otherwise ignore (and not use) any bitmap where all unmuted symbols in a slot are not consecutive. This may help operation of the TRP 300 by avoiding requiring the TRP 300 to transition between muting and unmuting back and forth quickly. As another example, the server 400 may be configured not to use a muting configuration that would result in a UE not having a small enough search window to be able to resolve aliases in the time domain due to a partially-staggered positioning signal resource. A partially-staggered positioning signal resource is not fully staggered in that not all of the subcarriers will be sounded by the resource. As another example, the server 400 may not use any muting configuration that does not have at least one positioning signal resource (e.g., PRS resource) that is fully staggered (i.e., will sound all subcarriers of a slot).

As another example, the server 400 may be configured to try to keep a balance between muting and not muting PRS signals (e.g., a balance between 1's and 0's in a bitmap) to help ensure measurement of PRS signals without excessive delay (e.g., due to waiting for a next transmission). The server 400 may be configured to provide one or more criteria for a muting configuration (e.g., randomly-generated pattern) to have a quantity of bits have a certain value (e.g., eight bits of a 16-bit bitmap must be 1's, or five bits of an 8-bit bitmap must be 0's), or to have a threshold quantity of bits have a certain value (e.g., at least three bits of an 8-bit bitmap must be 1's), or to have a ratio of bits of one value to bits of the other value, etc.

The server 400 may be configured to consider a desire to train a receive antenna pattern and/or a desire to help with signal integration in producing a PRS muting configuration. The server 400 may have a criterion for a bitmap to have a number of bits of the same value, e.g., indicating unmuted PR signals, which may facilitate or enable training of one or more receive schedules and/or help with integration of a PRS signal, e.g., a weakly-received PRS signal. For example, a criterion may be that the muting configuration has a threshold quantity of unmuted positioning signal indications to enable receive antenna pattern training. As another example, a criterion may be that the muting configuration has a threshold quantity of unmuted positioning signal indications to enable a threshold level of signal integration (e.g., a threshold level of total power). As another example, a criterion may be a maximum distance (e.g., maximum number of slots) between on-bits (indications not to mute). The UE 200 may be configured to observe the unmuted signal over multiple slots with the same antenna pattern and to integrate the received signal, e.g., to help receive a PRS signal with poor SNR (signal-to-noise ratio). The UE 200 may be configured to observe the unmuted signal over different slots with different antenna patterns to determine which antenna pattern yielded the strongest received signal. This information may be used to train one or more antenna patterns, e.g., to improve PRS signal reception.

The server 400 is configured, as appropriate, to obtain information relevant to the one or more criteria for the muting configurations. For example, the server 400 may be configured to obtain relevant information by receiving measurement information (e.g., raw measurements and/or processed measurements) from one or more UEs 200, one or more TRPs 300, and/or from taking measurements. As another example, the server 400 may be configured to obtain relevant information by being programmed with, or otherwise storing, information relevant to the one or more criteria (e.g., whether a TRP 300 is in a high-mobility area or a low-mobility area (i.e., whether UEs in a coverage area of the TRP 300 are expected to have high or low mobility). The server 400 may be configured to produce relevant information such as an RSTD uncertainty (a search window) that the server 400 provides to the UE 200 and uses to determine whether the RSTD uncertainty is small enough to enable the UE 200 to resolve aliased peaks due to intra-slot muting. The server 400 may be configured to use the obtained information to determine one or more of the criteria for the muting configuration.

The server 400 may be configured to implement on-demand intra-slot muting, e.g., based on a type of positioning signal triggering. For example, the server 400 may be configured to cause the TRP 300 to perform intra-slot muting (e.g., only send an intra-slot muting configuration to the TRP 300) only if MAC-CE-based (Media Access Control-Control Element based) DL PRS (Downlink PRS) triggering is used and/or DCI-based (Downlink Control Information based) DL PRS triggering is used. The server 400 may be configured to determine that MAC-CE-based DL PRS and/or that DCI-based DL PRS has been triggered (e.g., triggered by a serving TRP) and to respond by enabling intra-slot positioning signal (e.g., PRS) muting, e.g., by sending an intra-slot muting configuration to the TRP 300 or by sending an instruction (e.g., in a MAC-CE or DCI communication) to the TRP 300 to use an intra-slot muting configuration (e.g., previously sent to the TRP 300 or produced by the TRP 300). Such on-demand triggering of intra-slot muting may help ensure high-quality performance because intra-slot muting may use rapid muting changes (muting to not muting and vice versa) and thus is a low-latency technique, and MAC-CE and DCI-based DL PRS are low-latency techniques as well.

Figure 15:
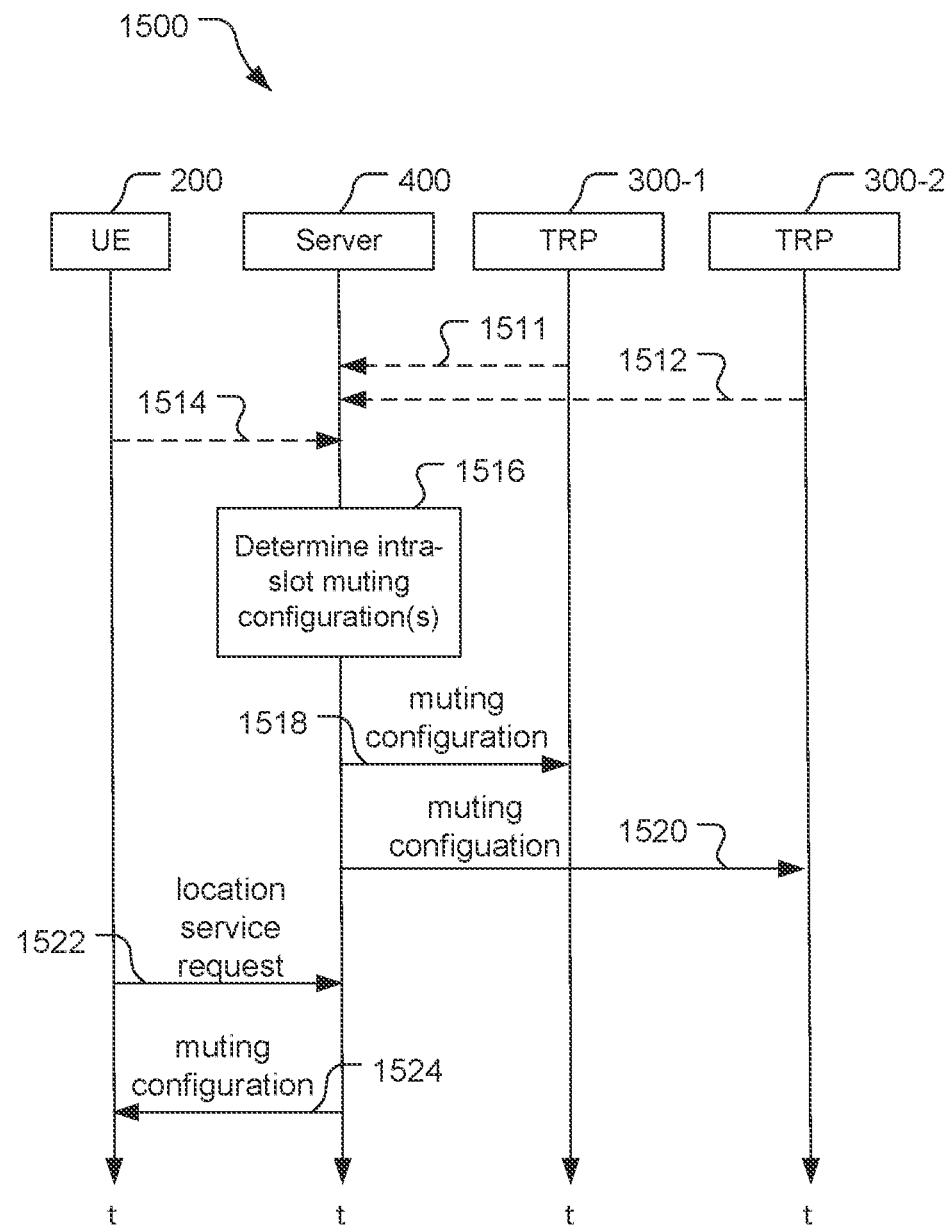
FIG. 15 is a signal and processing flow diagram for intra-slot muting of positioning signals.

Referring also to FIG. 15, a signal and processing flow 1500 shows communications between the UE 200, the server 400, and two TRPs 300-1, 300-2, and processing by the server 400 to implement an intra-slot muting configuration. The signal and processing flow 1500 includes messages and stages shown and is an example only and not limiting. The flow 1500 may be altered. e.g., by having messages and/or stages added, removed, rearranged, combined, performed concurrently, and/or having one or more messages and/or stages split into multiple messages and/or stages.

The TRPs 300-1, 300-2 may provide one or more messages 1511, 1512 to the server 400 that may influence the determination (e.g., production or selection) of one or more intra-slot muting configurations and/or whether to implement intra-slot muting. For example, one or more of the messages 1511, 1512 may indicate whether MAC-CE-based DL PRS and/or DCI-based DL PRS is in use. As another example, one or more of the messages 1511, 1512 may indicate a search window of the UE 200 for receiving a PRS. As another example, one or more of the messages 1511, 1512 may indicate one or more intra-slot muting configurations stored by the TRP(s) 300-1, 300-2 and/or PRS transmission parameters such as a comb type and a length of PRS (in slots) used by the TRP(s) 300-1, 300-2. As another example, one or more of the messages 1511, 1512 may include information that the server 400 may use to determine an intra-slot muting configuration. For example, one or more of the messages 1511, 1512 may include configuration information of a positioning signal resource (e.g., comb type, number of consecutive symbols in a respective slot, number of repetitions, etc.).

The UE 200 may provide information in a message 1514 that the server may use in determining one or more intra-slot muting configurations and/or whether to implement intra-slot muting. For example, the UE 200 may provide information as to a search window that the UE 200 may use to receive a positioning signal. The UE 200 also or alternatively may indicate whether the UE has requested MAC-CE-based and/or DCI-based DL PRS.

Figure 16:
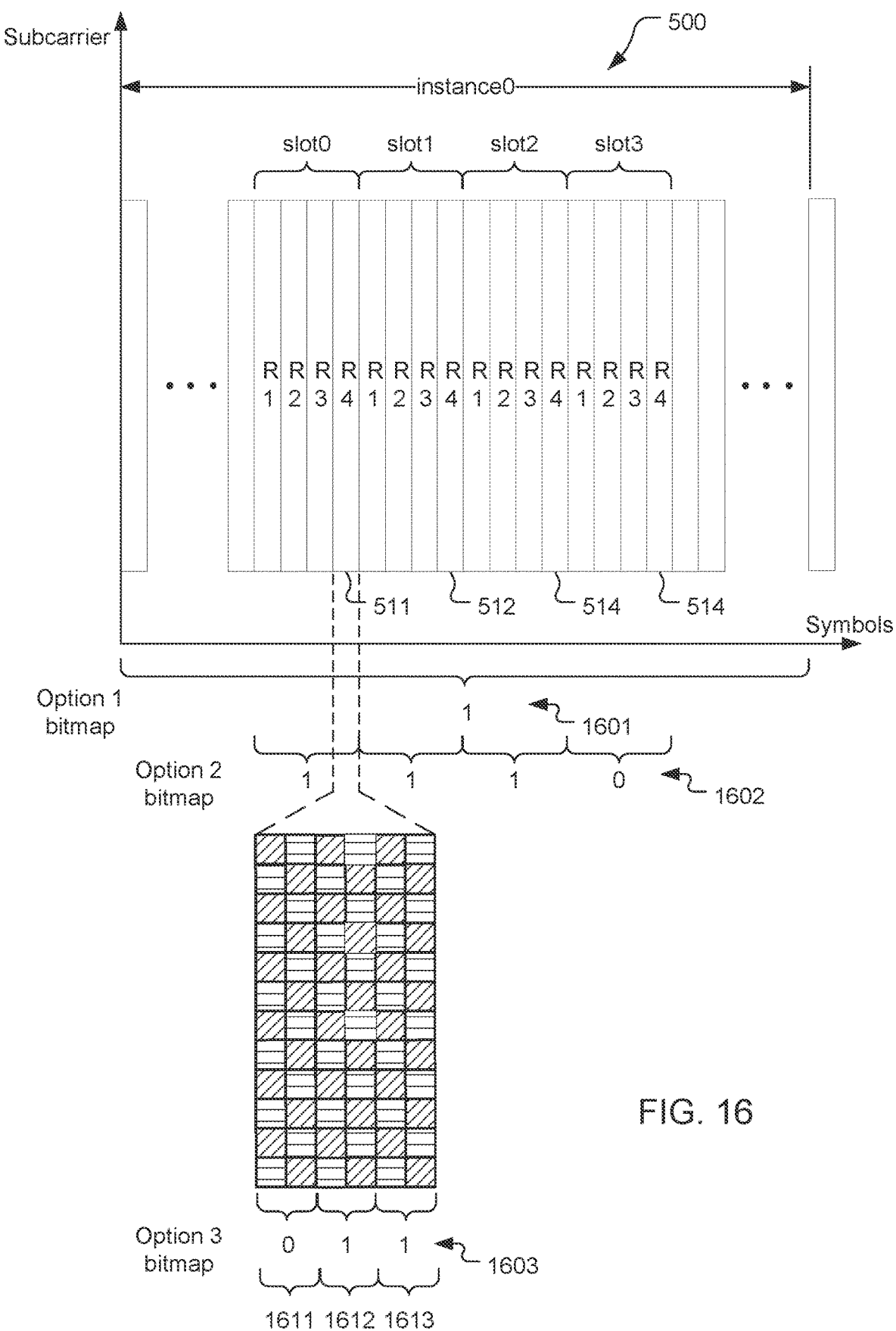
FIG. 16 is an illustration of using bitmaps for inter-instance muting and intra-instance muting, and selective use of intra-slot muting.

At stage 1516, the server 400 determines an intra-slot muting configuration, e.g., a bitmap, with appropriate characteristics. The server 400 may determine the muting configuration as discussed above, e.g., by selecting a stored schedule or by generating a schedule. The server 400 may generate a schedule using one or more techniques discussed herein and/or one or more other techniques for generating an intra-slot muting configuration (e.g., a bitmap corresponding to the schedule). The server 400 may only use a muting configuration that meets one or more criteria such as those discussed above, e.g., to have unmuted segments within a slot be consecutive. The one or more criteria may include one or more criteria regarding performance indications, facilitating antenna pattern training, balancing muting and non-muting, having one or more specified slot segments with specified bitmap values, helping to ensure orthogonality (e.g., reducing a probability of colliding with another signal to below a threshold probability), and/or facilitating positioning in high-mobility environments, etc. The one or more criteria may include that there must be at least three intra-slot groups (i.e., fully staggered sets of symbols) before the server 400 will determine an intra-slot muting configuration (or at least provide an intra-slot muting configuration to a TRP 300). For example, referring to FIG. 16, if only the fourth resource R4 of the resource set 500 shown in FIG. 5 has at least three intra-slot groups, here groups 1611, 1612, 1613, then intra-slot muting (Option 3 muting) may only be applied to the fourth resource R4. Only the first repetition of the fourth resource R4 is expanded for the sake of simplicity in FIG. 16, but the intra-slot muting may be applied to other repetitions as well. The fourth resource R4 may have only intra-slot muting applied as indicated by a bitmap 1603, or may have intra-slot muting in combination with inter-instance (Option 1) muting (as shown by a bitmap 1601) and/or intra-instance (Option 2) muting (as shown by a bitmap 1602) applied. For example, a logical combination of the bitmap 1603 and the bitmap 1601 and/or the bitmap 1602 may yield an intra-slot muting configuration that may be applied. Inter-instance and/or intra-instance muting may be applied to the other resources R1, R2, R3. The one or more criteria may be used to affect how a bitmap is produced (e.g., specifying to a random number generator (e.g., implemented by the processor 410) that only values of 1 or 0 are to be produced, and a specified quantity of 1's out of a total quantity of bits). Also or alternatively, the server 400 may produce a bitmap and then determine whether the one or more criteria are met by the bitmap. The server 400 may discard a bitmap that does not meet the one or more criteria or modify the bitmap so that the modified bitmap meets the one or more criteria.

The server 400 may provide the appropriate PRS muting configuration to each of the TRPs 300-1, 300-2 in messages 1518, 1520, respectively. The server 400 may send the bitmap for the respective PRS muting configuration(s) in the message(s) to the TRP(s) 300-1, 300-2. Each of the TRPs 300-1, 300-2 will use the respective PRS muting configuration to determine when to send a PRS signal (transmit a PRS signal unmuted) and when not to send a PRS signal (to mute transmission of the PRS signal). The TRPs 300-1, 300-2 may repeat the respective muting configurations, e.g., until instructed otherwise by the server 400. The TRPs 300-1, 300-2 may determine the PRS muting configurations by reading the messages 1518, 1520, or the TRPs 300-1, 300-2 may determine, e.g., as discussed with respect to stage 1516, the respective PRS muting configurations, or one of the TRPs 300-1, 300-2 may determine, e.g., as discussed with respect to stage 1516, the PRS muting configurations.

The UE 200 may request location service from the server 400 in a message 1522. The message 1522 may be sent directly to the server 400 as shown, or may be sent to the server 400 indirectly via one or more of the TRPs 300-1, 300-2 (and/or via one or more other TRPs). Although the request 1522 is shown occurring after the stage 1516 and after the muting configuration(s) is(are) sent to the TRP(s) 300-1, 300-1, the UE 200 may send the request 1522 at any time.

The server 400 may respond to the location service request 1522 from the UE 200 by sending the appropriate muting configuration(s) to the UE 200 in a message 1524. The server 400 may send the muting configuration(s) of the TRP(s) 300-1, 300-2 in the vicinity of the UE 200 (e.g., a serving TRP and neighboring TRPs, or TRPs within a radius of a location estimate for the UE 200, etc.). The UE 200 may use the muting configuration(s) to save energy, e.g., by avoiding wasting power searching for signals during time windows during which the signals will not be sent and/or narrowing search time windows to windows of time indicated in the PRS muting configuration that the corresponding PRS signals will be sent unmuted. The message 1524 may include a search window to be used by the UE 200 to acquire and receive positioning signals. The server 400 may send the message 1524 directly to the UE 200 as shown, or indirectly via one or more of the TRPs 300-1, 300-2, and/or via one or more other TRPs 300.

Figure 17:
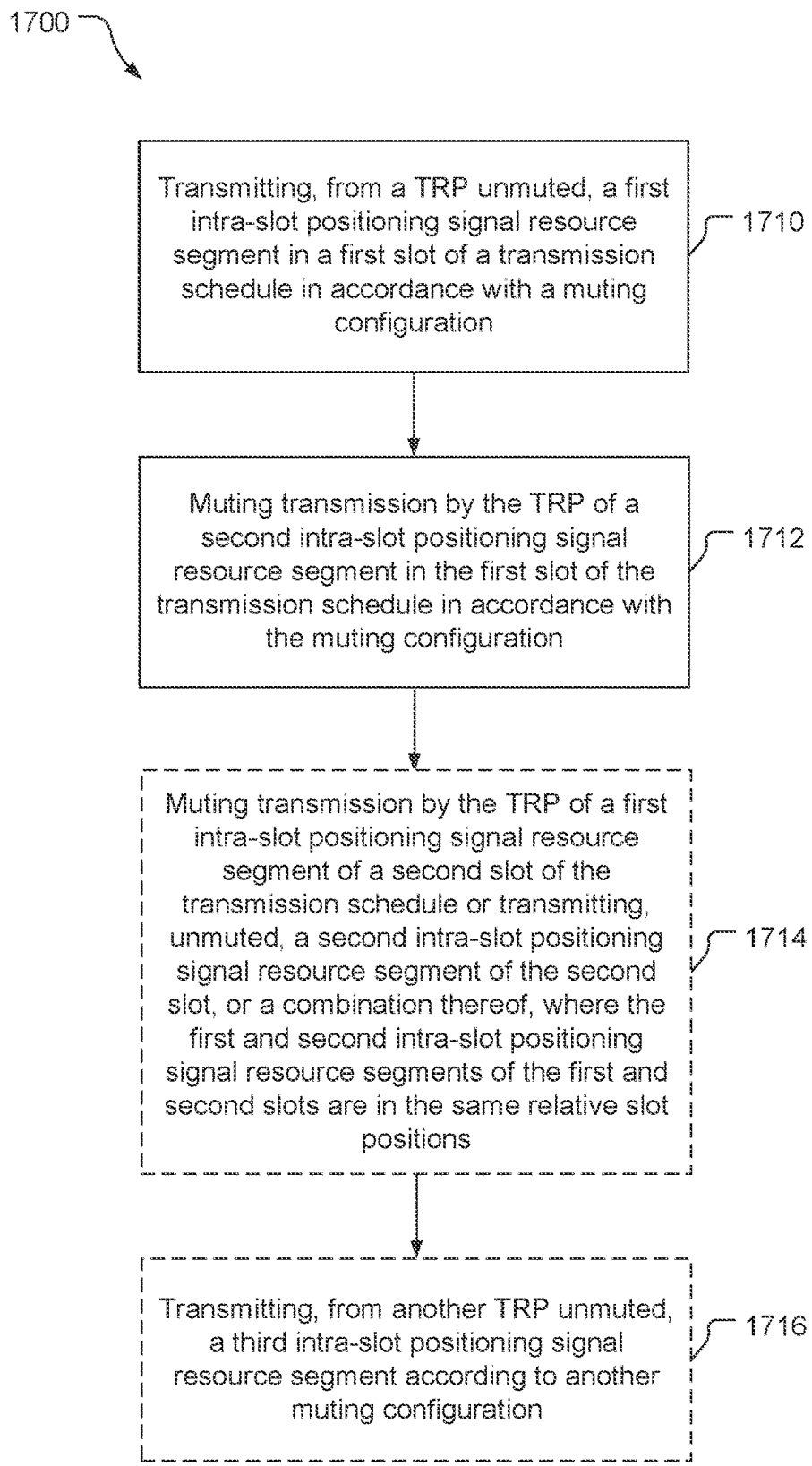
FIG. 17 is a block flow diagram of a method of transmitting a positioning signal.
Figure 18:
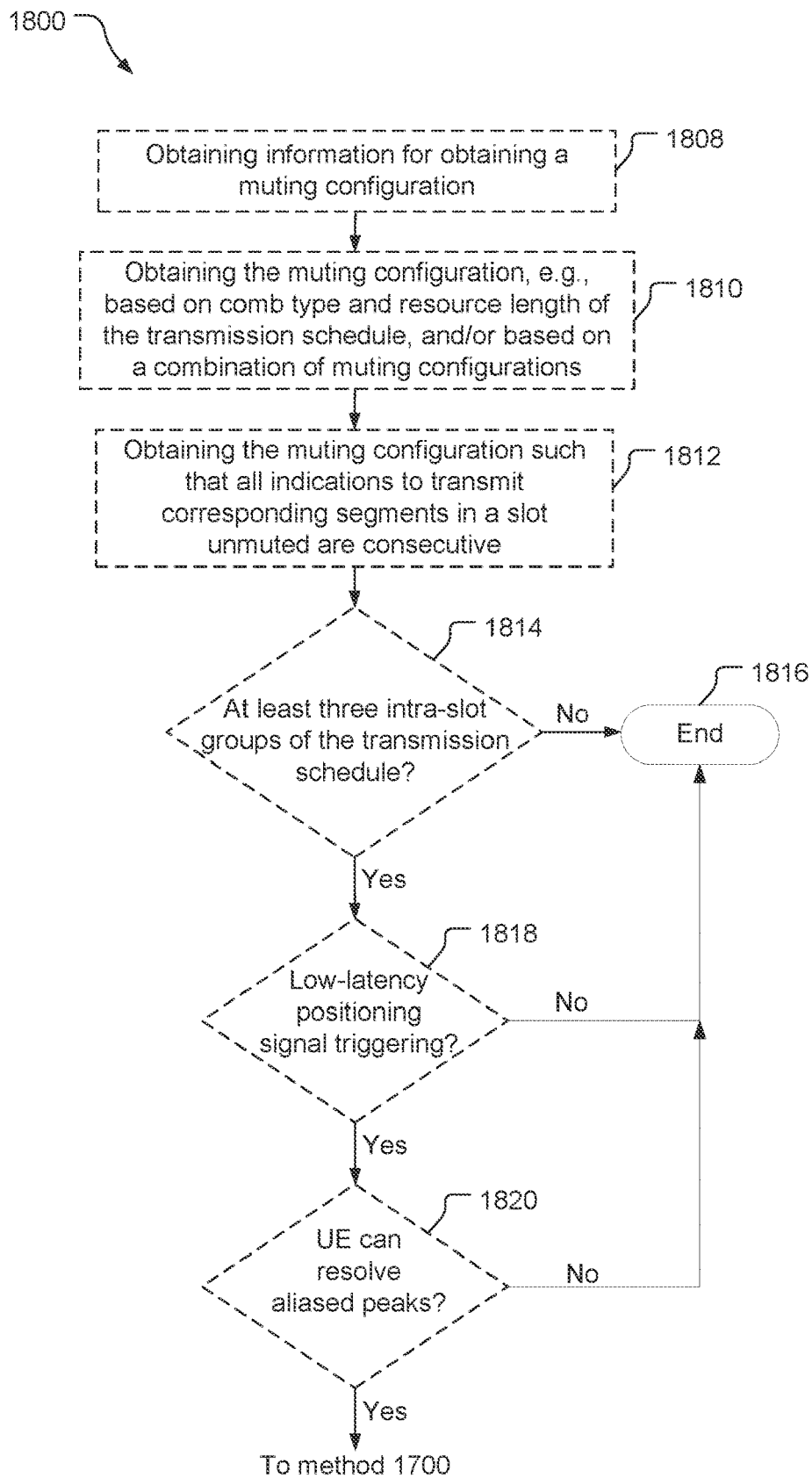
FIG. 18 is a block flow diagram of optional stages preceding the method shown in FIG. 17.

Referring to FIG. 17, with further reference to FIGS. 1-15, a method 1700 of transmitting a positioning signal includes the stages shown. The method 1700 is, however, an example only and not limiting. The method 1700 may be altered, e.g., by having stages added, removed, rearranged, combined, performed concurrently, and/or having single stages split into multiple stages. For example, one or more stages may occur before, and/or one or more stages may occur after, the stages shown in FIG. 17. For example, stage 1714 discussed below may be removed from the method 1700, and one or more stages shown in FIG. 18 and discussed below may be added. As another example, a stage of receiving a muting configuration at a TRP (e.g., from a server) may be performed before stage 1710, with the processor 310, possibly in combination with the memory 311, in combination with the transceiver 315 (e.g., the wireless receiver 344 and the antenna 346, or the wired receiver 354) comprising means for receiving the muting configuration. Still other examples are possible, including other functions discussed below and/or functions other than those discussed below. The method 1700 is implemented by the TRP 300, which may be a gNB. For example, the method 1700 may be implemented by a gNB co-located with, or integrated with, an LMF. The method 1700 may, however, be caused to be implemented by the server 400, e.g., the server 400 may cause the TRP 300 to perform the stages shown (and/or other stages). Still other implementations are possible.

At stage 1710, the method 1700 includes transmitting, unmuted from a TRP, a first intra-slot positioning signal resource segment in a first slot of a transmission schedule in accordance with a muting configuration. For example, the TRP 300 may transmit, unmuted, a segment including symbols 5 and 6 of the first slot 1001 shown in FIG. 10, with the bitmap value of 1 of the muting configuration 1020 corresponding to these symbols indicating not to mute transmission of these symbols. Thus, the "first intra-slot positioning signal resource segment" is a label and this segment need not be the first symbols for transmitting a positioning signal in a slot according to the transmission schedule. Similarly, the "first slot" is a label and does not require the slot to be the first slot of the transmission schedule. The server 400 may cause the TRP 300 to transmit the first segment, e.g., by sending the transmission schedule and the muting configuration to the TRP 300, and the TRP 300 may use the transmission schedule to transmit the positioning signal, muting intra-slot segments as indicated by the muting configuration. Causing the TRP to transmit, unmuted, the first intra-slot positioning signal resource segment may comprise sending the transmission schedule and muting configuration to the TRP for execution. Transmitting, unmuted, the first intra-slot positioning signal resource segment may comprise executing the transmission schedule in view of the muting configuration by the TRP, with the transmission and muting configurations stored and/or produced by the TRP. The processor 310, possibly in combination with the memory 311 (e.g., the software 312), in combination with the transceiver 315 (e.g., the wireless receiver 344), may comprise means for transmitting, unmuted, the first intra-slot positioning signal resource segment. Also or alternatively, the processor 410, possibly in combination with the memory 411 (e.g., the software 412) and possibly in combination with the transceiver 415 (e.g., the wireless transmitter 442 and the antenna 446, and/or the wired transmitter 452), may comprise means for causing the TRP to transmit, unmuted, the first intra-slot positioning signal resource segment.

The TRP may transmit the first intra-slot positioning signal resource segment in the first slot, with the first intra-slot positioning signal resource segment having various possible sizes. For example, the first intra-slot positioning signal resource segment may be equal in size to intra-slot groups of the first slot where each intra-slot group is fully staggered, indicating to sound all subcarriers of the transmission schedule over a respective set of symbols in the intra-slot group. Each of the intra-slot groups may comprise an identical portion of the transmission schedule, with each intra-slot group having an identical pattern of sounded resource elements over the symbols of the intra-slot group. As another example, the first segment may be smaller in size than intra-slot groups of the first slot where each intra-slot group is fully staggered. For example, the first intra-slot positioning signal resource segment may be a single symbol whereas the intra-slot groups are at least two symbols in length. In this case, the number of intra-slot positioning signal resource segments may equal the number of positioning signal symbols in the first slot (i.e., the number of symbols in the first slot designated by the transmission schedule for conveying the positioning signal).

At stage 1712, the method 1700 includes muting transmission by the TRP of a second intra-slot positioning signal resource segment of the first slot of the transmission schedule in accordance with the muting configuration. For example, the TRP 300 may mute transmission of the second intra-slot positioning signal resource segment in accordance with the transmission schedule and the muting configuration (e.g., as provided by the server 400). The TRP, for example, may mute transmission of symbols 3 and 4 of the first slot 1001 shown in FIG. 10, with the bitmap value of 0 of the muting configuration 1020 corresponding to these symbols indicating to mute transmission of these symbols. The first and second intra-slot positioning signal resource segments of the first slot each comprises one or more subcarriers within one or more symbols of the slot, and are separate portions of the slot. The second intra-slot positioning signal resource segment, in this example, corresponds to an intra-slot group. Other sizes of segments, however, may be used. For example, each segment shown in FIG. 11 corresponds to a symbol, which is smaller than the intra-slot groups shown in FIG. 11, which are two symbols long each. Thus, for example, the second intra-slot positioning signal resource segment may correspond to symbol number 3 of the first slot 1101 shown in FIG. 11, which is a portion of an intra-slot group consisting of slots 3 and 4 of the first slot 1101. Thus, the intra-slot group consisting of slots 3 and 4 becomes unstaggered with transmission of slot 3 being muted. Causing the TRP to mute transmission of the second intra-slot positioning signal resource segment may comprise sending the transmission and muting configurations to the TRP for execution. Muting transmission of the second intra-slot positioning signal resource element may comprise executing the transmission schedule in view of the muting configuration by the TRP, with the transmission and muting configurations stored and/or produced by the TRP. The processor 310, possibly in combination with the memory 311 (e.g., the software 312), may comprise means for muting transmission of the second segment. Also or alternatively, the processor 410, possibly in combination with the memory 411 (e.g., the software 412), in combination with the transceiver 415 (e.g., the wireless transmitter 442 and the antenna 446, and/or the wired transmitter 452), may comprise means for causing the TRP to mute transmission of the second segment.

The method 1700 may include one or more other features. For example, the method 1700 may include stage 1714 of muting transmission of a first intra-slot positioning signal resource segment of a second slot of the transmission schedule, or transmitting, unmuted, a second intra-slot positioning signal resource segment of the second slot, or both of these, where the first and second segments of the first and second slots, respectively, are in the same relative slot positions. For example, first intra-slot positioning signal resource segments of the slots 1301, 1302 may each correspond to symbol 0 of the slots 1301, 1302, respectively, and second intra-slot positioning signal resource segments of the slots 1301, 1302 may each correspond to symbol 1 of the slots 1301, 1302. The processor 310, possibly in combination with the memory 311 (e.g., the software 312), and possibly in combination with the transceiver 315 (e.g., the wireless transmitter 342 and the antenna 346), may comprise means for muting transmission of the first intra-slot positioning signal of a second slot or transmitting, unmuted, a second intra-slot positioning signal resource segment, or a combination thereof. The processor 410, possibly in combination with the memory 411 (e.g., the software 412), in combination with the transceiver 415 (e.g., the wireless transmitter 442 and the antenna 446, and/or the wired transmitter 452), may comprise means for causing the TRP to mute transmission of the first intra-slot positioning signal of a second slot or to transmit, unmuted, a second intra-slot positioning signal resource segment, or a combination thereof. As another example, the method 1700 may include stage 1716 of transmitting, from another TRP unmuted, a third intra-slot positioning signal resource segment according to another muting configuration. Thus, different resources may have different muting configurations (e.g., the muting configurations 1320, 1330) applied and thus may have segments transmitted, unmuted, in accordance with different muting configurations and/or mute transmissions differently in accordance with different muting configurations. The processor 310, possibly in combination with the memory 311, in combination with the transceiver 315 (e.g., the wireless transmitter 342 and the antenna 346, and/or the wired transmitter 352) of another TRP may comprise means for transmitting, unmuted, the third intra-slot positioning signal resource segment according to the other muting configuration. The processor 410, possibly in combination with the memory 411 (e.g., the software 412), in combination with the transceiver 415 (e.g., the wireless transmitter 442 and the antenna 446, and/or the wired transmitter 452), may comprise means for causing another TRP to transmit, unmuted, a third intra-slot positioning signal resource segment according to another muting configuration.

One or more other stages may be included as part of, before, and/or after the method 1700. For example, referring to FIG. 18, several optional stages of a method 1800 are shown that may be performed before stage 1710 of the method 1700. Each of the stages of the method 1800 shown is optional. One or more other stages may be included in the method 1800. While the discussion of the method 1800 focuses on the server 400 being configured to perform and performing functions, the TRP 300 may be configured to perform, and perform, some or all of the functions.

At stage 1808, the method 1800 includes obtaining information for obtaining a muting configuration. For example, the server 400 or a TRP 300 may obtain configuration information for transmitting one or more positioning signal (e.g., PRS) resources by one or more TRPs 300. For example, the server 400 may obtain configuration information from one or more of the TRPs 300-1, 300-2 via one or more of the messages 1511, 1512. The configuration information may include, for example, a comb type, a resource length, a number of repetitions, etc. Also or alternatively, the server 400 may be configured to read configuration information (e.g., the muting configuration) from the memory 411 and/or to produce and send the configuration information (which may include the muting configuration) to the TRP(s) 300-1, 300-2, e.g., in the messages 1518, 1520. The TRP 300 may receive the configuration information and use the configuration information as appropriate (e.g., derive the muting configuration from the configuration information or read the muting configuration from the configuration information). The processor 410, possibly in combination with the memory 411 (e.g., the software 412) and/or the transceiver 415, may comprise means for obtaining information for obtaining the muting configuration. Also or alternatively, the processor 310, possibly in combination with the memory 311 (e.g., the software 312) and/or the transceiver 315, may comprise means for obtaining information for obtaining the muting configuration.

At stage 1810, the method 1800 may include obtaining the muting configuration, e.g., based on positioning signal resource configuration information such as comb type, resource length, number of repetitions, etc., and/or based on a combination of muting configurations. For example, the server 400 or a TRP 300 may determine segment sizes for a bitmap representing the muting configuration based on the comb type and resource length. For example, the server 400 may be configured to obtain the muting configuration using one or more of a variety of techniques. For example, the server 400 may be configured to derive the muting pattern, e.g., based on such parameters, and/or may be configured to select a stored muting pattern, e.g., based on such parameters, and/or may be configured to obtain the muting configuration using one or more other techniques. The muting configuration may be different for different slots and/or for different positioning signal resources. The server 400 may, for example, set a segment size to be equal to the number of symbols in a slot for transmitting the positioning signal divided by the comb number. The server 400 may determine a muting configuration based on a combination of muting configurations. For example, the server 400 may logically combine (e.g., with a logical AND) an intra-slot muting configuration with one or more other muting configurations. For example, the server 400 may be configured to determine Option 1 AND Option 3, or Option 2 AND Option 3, or Option 1 AND Option 2 AND Option 3. Thus, for example, only where all ANDed muting configurations indicate to transmit unmuted will the resultant muting configuration indicate to transmit unmuted. The processor 410, possibly in combination with the memory 411 (e.g., the software 412), may comprise means for determining the muting configuration. Also or alternatively, the processor 310, possibly in combination with the memory 311 (e.g., the software 312), may comprise means for determining the muting configuration.

At stage 1812, the method 1800 may include obtaining the muting configuration such that all indications to transmit corresponding segments in a slot unmuted are consecutive. For example, the processor 410 may not use (e.g., discard, ignore, not select) any potential muting configuration (e.g., produced by the processor 410, or stored by the memory 411 and selected by the processor 410) that has multiple indications to transmit a corresponding slot segment unmuted where the indications are not consecutive (e.g., to ignore a muting configuration of 1011, but allow a muting configuration of 0111). The processor 410, possibly in combination with the memory 411 (e.g., the software 412), may comprise means for determining the muting configuration. Also or alternatively, the processor 310, possibly in combination with the memory 311 (e.g., the software 312), may comprise means for determining the muting configuration.

At stage 1814, the method 1800 may include determining whether at least three intra-slot groups are included in the transmission schedule. For example, the server 400 may determine whether the length of a resource divided by the number of symbols in an intra-slot group is at least three. The server 400 may not implement intra-slot muting if there are not at least three intra-slot groups per slot (e.g., the server 400 may not determine such an intra-slot muting configuration, or at least not send such an intra-slot muting configuration to the TRP 300, or not send an instruction to the TRP 300 for the TRP 300 to use such an intra-slot muting configuration produced by or stored by the TRP 300). If there are not at least three intra-slot groups, then the method 1800 may end at stage 1816 without proceeding to the method 1700. The processor 410, possibly in combination with the memory 411 (e.g., the software 412), may comprise means for determining that the muting configuration includes at least three intra-slot groups. Also or alternatively, the processor 310, possibly in combination with the memory 311 (e.g., the software 312), may comprise means for determining that the muting configuration includes at least three intra-slot groups.

At stage 1818, the method 1800 may include determining whether low-latency positioning signal triggering is in use. For example, the server 400 may be configured to determine whether MAC-CE-based DL PRS triggering is in use (e.g., has been requested) and/or configured to determine whether DCI-based DL PRS triggering is in use. If low-latency positioning signal triggering is not in use, then the method 1800 may end at stage 1816 without proceeding to the method 1700. The processor 410, possibly in combination with the memory 411 (e.g., the software 412), may comprise means for determining whether low-latency positioning signal triggering is in use. Also or alternatively, the processor 310, possibly in combination with the memory 311 (e.g., the software 312), may comprise means for determining whether low-latency positioning signal triggering is in use.

At stage 1820, the method 1800 may include determining whether a UE can resolve aliased peaks. For example, the server 400 may determine whether the UE has a small enough search window (e.g., an RSTD uncertainty below an acceptable threshold) to resolve aliased peaks if the muting configuration will cause partial staggering (less than all subcarriers being sounded) for conveying a positioning signal. The server 400 may, for example, obtain information about the search window from the UE 200, or may have sent the search window to the UE 200 and thus may have the search window stored. The server 400 may proceed to the method 1700 in response to determining (only if the server 400 determines) that the UE 200 has a small enough search window to resolve the aliased peaks, and may end at stage 1816 otherwise.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the server 400 (e.g., for determining and implementing PRS muting configurations) may be performed outside of the server 400 such as by the TRP 300. A statement that a feature that may implement a function includes that the feature may be configured to implement the function (e.g., a statement that the server 400 may perform function X includes that the server 400 may be configured to perform function X).

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS. CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C." or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value. e.g., the second threshold value being one value lower than the first threshold value in the resolution of a computing system.

The invention claimed is:

1. A method of selectively transmitting a positioning signal from a wireless communication device, the method comprising:
    transmitting, unmuted from the wireless communication device, a first intra-slot positioning signal resource segment in a first slot of a transmission schedule in accordance with a muting configuration, the transmission schedule indicating which one or more resource elements to sound in each of a plurality of consecutive symbols for transmitting a resource of the positioning signal within a slot of the transmission schedule, the muting configuration indicating whether to mute each of a plurality of intra-slot positioning signal resource segments, wherein each of the plurality of intra-slot positioning signal resource segments consists of a subset of the plurality of consecutive symbols; and
    muting transmission by the wireless communication device of a second intra-slot positioning signal resource segment in the first slot of the transmission schedule in accordance with the muting configuration;
    wherein the plurality of intra-slot positioning signal resource segments includes the first intra-slot positioning signal resource segment in the first slot and the second intra-slot positioning signal resource segment in the first slot, each of the plurality of intra-slot positioning signal resource segments including at least one symbol and being a separate portion of a respective slot and a separate portion of a single resource of the positioning signal.

2. The method of claim 1, wherein the transmission schedule includes a first integer quantity G of intra-slot groups for the first slot, where $G \geq 2$, wherein each of the intra-slot groups indicates to sound all subcarriers of the transmission schedule over a respective set of symbols, wherein the muting configuration includes a second integer quantity M of intra-slot positioning signal resource segments in the first slot, and wherein $M=G$.

3. The method of claim 2, wherein each of the intra-slot groups consists of an identical portion of the transmission schedule, having the same pattern of resource elements to be sounded.

4. The method of claim 1, wherein the transmission schedule includes a first integer quantity G of intra-slot groups for the first slot, where $G \geq 2$, wherein each of the intra-slot groups indicates to sound all subcarriers of the transmission schedule over a respective set of symbols, wherein the muting configuration includes a second integer quantity M of intra-slot positioning signal resource segments in the first slot, and wherein $M>G$.

5. The method of claim 4, wherein the second integer quantity M equals a number of symbols configured for a resource of the positioning signal in the first slot.

6. The method of claim 1, wherein the second intra-slot positioning signal resource segment in the first slot is a second portion of an intra-slot group of symbols, the intra-slot group of symbols including a first portion and the second portion, the first portion of the intra-slot group of symbols indicating to sound less than all subcarriers of the transmission schedule, the method further comprising determining, as a condition of muting transmission of the second intra-slot positioning signal resource segment, that a user equipment to receive the positioning signal is configured with a search window that can resolve aliased channel energy response peaks corresponding to the first portion of the intra-slot group of symbols.

7. The method of claim 1, further comprising determining the muting configuration such that all indications to transmit corresponding intra-slot positioning signal resource segments in a slot unmuted are consecutive.

8. The method of claim 1, further comprising:
    muting transmission of a first intra-slot positioning signal resource segment in a second slot of the transmission schedule; or
    transmitting, unmuted, a second intra-slot positioning signal resource segment in the second slot of the transmission schedule; or
    a combination thereof;
    wherein, according to the transmission schedule, the first intra-slot positioning signal resource segment in the second slot is scheduled for a same first time relative to the second slot as the first intra-slot positioning signal resource segment in the first slot is scheduled relative to the first slot, and the second intra-slot positioning signal resource segment in the second slot is scheduled for a same second time relative to the second slot as the second intra-slot positioning signal resource segment in the first slot is scheduled relative to the first slot.

9. The method of claim 1, wherein transmitting, unmuted, the first intra-slot positioning signal resource segment in the first slot and muting transmission of the second intra-slot positioning signal resource segment in the first slot are performed in response to determining that the first slot of the transmission schedule includes at least three intra-slot groups that each indicates to sound all subcarriers of the transmission schedule over a respective set of symbols.

10. The method of claim 1, wherein transmitting, unmuted, the first intra-slot positioning signal resource segment in the first slot and muting transmission of the second intra-slot positioning signal resource segment in the first slot are performed in response to determining that MAC-CE-based (Media Access Control-Control Element based) positioning signal triggering is in use or that DCI-based (Downlink Control Information based) positioning signal triggering is in use, or a combination thereof.

11. The method of claim 1, further comprising determining the muting configuration based on a comb type and a resource length of the transmission schedule.

12. The method of claim 1, wherein the muting configuration is an intra-slot muting configuration, the method further comprising obtaining the muting configuration by determining a logical combination of the intra-slot muting configuration and at least one of an inter-instance muting configuration or an intra-instance muting configuration.

13. The method of claim 12, wherein determining the logical combination comprises determining:
    the intra-slot muting configuration AND the inter-instance muting configuration, wherein AND is a logical operator; or
    the intra-slot muting configuration AND the intra-instance muting configuration; or
    the intra-slot muting configuration AND the inter-instance muting configuration AND the intra-instance muting configuration.

14. The method of claim 1, wherein the muting configuration is a first muting configuration, the first intra-slot positioning signal resource segment corresponds to a first positioning signal resource, and the wireless communication device is a first wireless communication device, the method further comprising:

transmitting, unmuted from a second wireless communication device, a third intra-slot positioning signal resource segment in accordance with a second muting configuration that is different from the first muting configuration, the third intra-slot positioning signal resource segment corresponding to a second positioning signal resource that is different from the first positioning signal resource.

15. A wireless communication device comprising:
a transmitter;
a memory; and
a processor communicatively coupled to the transmitter and the memory and configured to:
transmit, unmuted via the transmitter, a first intra-slot positioning signal resource segment in a first slot of a transmission schedule in accordance with a muting configuration, the transmission schedule indicating which one or more resource elements to sound in each of a plurality of consecutive symbols for transmitting a resource of a positioning signal within a slot of the transmission schedule, the muting configuration indicating whether to mute each of a plurality of intra-slot positioning signal resource segments, wherein each of the plurality of intra-slot positioning signal resource segments consists of a subset of the plurality of consecutive symbols; and
mute transmission of a second intra-slot positioning signal resource segment in the first slot of the transmission schedule in accordance with the muting configuration;
wherein the plurality of intra-slot positioning signal resource segments includes the first intra-slot positioning signal resource segment in the first slot and the second intra-slot positioning signal resource segment in the first slot, each of the plurality of intra-slot positioning signal resource segments including at least one symbol and being a separate portion of a respective slot and a separate portion of a single resource of the positioning signal.

16. The wireless communication device of claim 15, wherein the transmission schedule includes a first integer quantity G of intra-slot groups for the first slot, where $G \geq 2$, wherein each of the intra-slot groups indicates to sound all subcarriers of the transmission schedule over a respective set of symbols, wherein the muting configuration includes a second integer quantity M of intra-slot positioning signal resource segments in the first slot, and wherein $M=G$.

17. The wireless communication device of claim 16, wherein each of the intra-slot groups consists of an identical portion of the transmission schedule, having the same pattern of resource elements to be sounded.

18. The wireless communication device of claim 15, wherein the transmission schedule includes a first integer quantity G of intra-slot groups for the first slot, where $G \geq 2$, wherein each of the intra-slot groups indicates to sound all subcarriers of the transmission schedule over a respective set of symbols, wherein the muting configuration includes a second integer quantity M of intra-slot positioning signal resource segments in the first slot, and wherein $M>G$.

19. The wireless communication device of claim 18, wherein the second integer quantity M equals a number of symbols configured for a resource of the positioning signal in the first slot.

20. The wireless communication device of claim 15, wherein the second intra-slot positioning signal resource segment in the first slot is a second portion of an intra-slot group of symbols, the intra-slot group of symbols including a first portion and the second portion, the first portion of the intra-slot group of symbols indicating to sound less than all subcarriers of the transmission schedule, and wherein the processor is configured to mute transmission of the second intra-slot positioning signal resource segment in response to a determination that a user equipment to receive the positioning signal is configured with a search window that can resolve aliased channel energy response peaks corresponding to the first portion of the intra-slot group of symbols.

21. The wireless communication device of claim 15, wherein the processor is configured to determine the muting configuration such that all indications to transmit corresponding intra-slot positioning signal resource segments in a slot unmuted are consecutive.

22. The wireless communication device of claim 15, wherein the processor is further configured to:
mute transmission of a first intra-slot positioning signal resource segment in a second slot of the transmission schedule; or
transmit, unmuted via the transmitter, a second intra-slot positioning signal resource segment in the second slot of the transmission schedule; or
a combination thereof;
wherein, according to the transmission schedule, the first intra-slot positioning signal resource segment in the second slot is scheduled for a same first time relative to the second slot as the first intra-slot positioning signal resource segment in the first slot is scheduled relative to the first slot, and the second intra-slot positioning signal resource segment in the second slot is scheduled for a same second time relative to the second slot as the second intra-slot positioning signal resource segment in the first slot is scheduled relative to the first slot.

23. The wireless communication device of claim 15, wherein the processor is configured to transmit, unmuted via the transmitter, the first intra-slot positioning signal resource segment in the first slot, and to mute transmission of the second intra-slot positioning signal resource segment in the first slot, in response to a determination that the first slot of the transmission schedule includes at least three intra-slot groups that each indicates to sound all subcarriers of the transmission schedule over a respective set of symbols.

24. The wireless communication device of claim 15, wherein the processor is configured to transmit, unmuted via the transmitter, the first intra-slot positioning signal resource segment in the first slot, and to mute transmission of the second intra-slot positioning signal resource segment in the first slot:
in response to a determination that MAC-CE-based (Media Access Control-Control Element based) positioning signal triggering is in use; or
in response to a determination that DCI-based (Downlink Control Information based) positioning signal triggering is in use; or
a combination thereof.

25. The wireless communication device of claim 15, wherein the processor is configured to determine the muting configuration based on a comb type and a resource length of the transmission schedule.

26. The wireless communication device of claim 15, wherein the muting configuration is an intra-slot muting configuration, and wherein the processor is configured to obtain the muting configuration by determining a logical combination of the intra-slot muting configuration and at least one of an inter-instance muting configuration or an intra-instance muting configuration.

27. The wireless communication device of claim 26, wherein to determine the logical combination the processor:
- is configured to determine the intra-slot muting configuration AND the inter-instance muting configuration, wherein AND is a logical operator; or
- is configured to determine the intra-slot muting configuration AND the intra-instance muting configuration; or
- is configured to determine the intra-slot muting configuration AND the inter-instance muting configuration AND the intra-instance muting configuration.

28. A wireless communication device comprising:
- means for transmitting, unmuted, a first intra-slot positioning signal resource segment in a first slot of a transmission schedule in accordance with a muting configuration, the transmission schedule indicating which one or more resource elements to sound in each of a plurality of consecutive symbols for transmitting a resource of a positioning signal within a slot of the transmission schedule, the muting configuration indicating whether to mute each of a plurality of intra-slot positioning signal resource segments, wherein each of the plurality of intra-slot positioning signal resource segments consists of a subset of the plurality of consecutive symbols; and
- means for muting transmission of a second intra-slot positioning signal resource segment in the first slot of the transmission schedule in accordance with the muting configuration;
- wherein the plurality of intra-slot positioning signal resource segments includes the first intra-slot positioning signal resource segment in the first slot and the second intra-slot positioning signal resource segment in the first slot, each of the plurality of intra-slot positioning signal resource segments including at least one symbol and being a separate portion of a respective slot and a separate portion of a single resource of the positioning signal.

29. The wireless communication device of claim 28, further comprising means for determining the muting configuration such that all indications to transmit corresponding intra-slot positioning signal resource segments in a slot unmuted are consecutive.

30. The wireless communication device of claim 28, wherein the muting configuration is an intra-slot muting configuration, the wireless communication device further comprising means for obtaining the muting configuration by determining a logical combination of the intra-slot muting configuration and at least one of an inter-instance muting configuration or an intra-instance muting configuration.

31. A non-transitory, processor-readable storage medium comprising processor-readable instructions to cause a processor of a wireless communication device to:
- transmit, unmuted, a first intra-slot positioning signal resource segment in a first slot of a transmission schedule in accordance with a muting configuration, the transmission schedule indicating which one or more resource elements to sound in each of a plurality of consecutive symbols for transmitting at least a portion of a positioning signal within a slot of the transmission schedule, the muting configuration indicating whether to mute each of a plurality of intra-slot positioning signal resource segments, wherein each of the plurality of intra-slot positioning signal resource segments consists of a subset of the plurality of consecutive symbols; and
- mute transmission of a second intra-slot positioning signal resource segment in the first slot of the transmission schedule in accordance with the muting configuration;
- wherein the plurality of intra-slot positioning signal resource segments includes the first intra-slot positioning signal resource segment in the first slot and the second intra-slot positioning signal resource segment in the first slot, each of the plurality of intra-slot positioning signal resource segments including at least one symbol and being a separate portion of a respective slot and a separate portion of a single resource of the positioning signal.

32. The method of claim 1, wherein the wireless communication device is a transmission/reception point.

33. The wireless communication device of claim 15, wherein the wireless communication device is a transmission/reception point.

* * * * *